(12) United States Patent
Sparr et al.

(10) Patent No.: US 12,015,992 B2
(45) Date of Patent: Jun. 18, 2024

(54) PRECISION TWO-WAY TIME TRANSFER OVER METEORBURST COMMUNICATIONS CHANNELS

(71) Applicant: SRI International, Menlo Park, CA (US)

(72) Inventors: Robert H. Sparr, San Carlos, CA (US); Jesse Wodin, Denver, CO (US); Justin D. Landrum, San Francisco, CA (US); Joseph M. Strus, Redwood City, CA (US); Boskin Erkocevic, Superior, CO (US); Jacob M. Cooper, Santa Clara, CA (US); David Watt, Superior, CO (US); Joshua A. Arndt, Great Mills, MD (US)

(73) Assignee: SRI International, Menlo Park, CA (US)

( * ) Notice: Subject to any disclaimer, the term of this patent is extended or adjusted under 35 U.S.C. 154(b) by 145 days.

(21) Appl. No.: 17/835,148

(22) Filed: Jun. 8, 2022

(65) Prior Publication Data
US 2023/0094838 A1    Mar. 30, 2023

Related U.S. Application Data

(60) Provisional application No. 63/219,062, filed on Jul. 7, 2021.

(51) Int. Cl.
*H04W 56/00* (2009.01)
*H04B 7/145* (2006.01)
(52) U.S. Cl.
CPC ......... *H04W 56/005* (2013.01); *H04B 7/145* (2013.01); *H04W 56/0015* (2013.01)

(58) Field of Classification Search
CPC ........... H04W 56/005; H04W 56/0015; H04W 12/61; H04W 40/244; H04W 40/20;
(Continued)

(56) References Cited

U.S. PATENT DOCUMENTS

2001/0038674 A1 * 11/2001 Trans .................... H04L 7/0008
370/503
2002/0131398 A1    9/2002 Taylor
(Continued)

OTHER PUBLICATIONS

Latorre, Victor R., The Phase Stability of VHF Signals Reflected from Meteor Trails, IEEE Transactions on Antennas and Propagation, AP-13, No. 4, pp. 546-550 (Jul. 1965).
(Continued)

*Primary Examiner* — Lana N Le
(74) *Attorney, Agent, or Firm* — MCDONNELL BOEHNEN HULBERT & BERGHOFF LLP

(57) ABSTRACT

Systems and methods for clock synchronization are disclosed. A client synchronization system (CSS) may transmit RF pulses to a server CSS over micrometeorite ionization trail (MMIT) channels, and may receive RF pulses from the server CSS over MMIT channels, each received RF pulse following transmitted RF pulse. The client CSS may receive from the server CSS over MMIT channels measurement data including pulse arrival times at the server CSS. The measurement and transmission data may be correlated to identify RF-pulse pairs, each pairing a transmitted RF pulse received by the server CSS with a received RF pulse received from the server CSS, both over the same MMIT. TWTT analysis may be applied to timing data the pairs to compute time offsets between a client clock and a server clock. An analytical model of clock drift may be applied to the offsets to synchronize the client clock to the server clock.

20 Claims, 9 Drawing Sheets

(58) Field of Classification Search
CPC ........ H04B 7/145; H04B 7/22; H04B 17/309;
H04B 1/7183; H04B 7/2126; H04B
7/1855; H04B 2203/5495; H04B 1/00;
H04B 17/27; G01S 11/08; G01S 15/8959;
G01S 3/46; G01S 7/4865; H04L 7/0008;
H04L 9/32; H04L 63/0414
See application file for complete search history.

(56) References Cited

U.S. PATENT DOCUMENTS

| | | | | |
|---|---|---|---|---|
| 2008/0186231 | A1* | 8/2008 | Aljadeff | G01S 3/46 342/387 |
| 2012/0102234 | A1* | 4/2012 | Bui | H04J 3/0661 709/248 |
| 2014/0133656 | A1* | 5/2014 | Wurster | H04W 40/20 380/270 |
| 2016/0218820 | A1* | 7/2016 | Scurrell | H04J 3/0661 |
| 2017/0214479 | A1 | 7/2017 | Heine | |
| 2018/0310272 | A1 | 10/2018 | Younis | |

OTHER PUBLICATIONS

Yavuz, Davras, Meteor Burst Communications, IEEE Communications Magazine, Sep. 1990, p. 40-48.

R. Fenichael, Evaluation of Advanced Meteor Burst Communication Techniques, Final Report on Contract DCA100-910-C-0032, Dec. 1992).

Sanders et al., An Automatic Meteor Burst time Synchronization System for Aerospace Applications, Supplement to IEEE Transactions on Aerospace and Electronic Systems, vol. AES-2, No. 4, Jul. 1966 p. 624-629.

Sanders, et al., A Meteor Burst clock Synchronization Experiment, Authorized licensed use limited to: SRI Internationals. Downloaded on Apr. 14, 2022 from IEEE Xplore, p. 184-189.

DuHamel, et al., A New Concept in High Frequency Antenna Design, IEEE Xplore, IRE National Convention Record, Part 1, 1959, pp. 42-51.

Griffiths, Lloyd J., Rapid Measurement of Digital Instantaneous Frequency, IEEE Transactions on Acoustics, Speech, and Digital Processing, Apr. 1975, pp. 207-222.

Antenna Products Data Sheets for: LPD-220-A10 from Antenna Research Associates (ARA), the TLP-20 from Antenna Power, and the SLP30-88 from SEC Antenna.

Mark A. Gates, "Survivability of Meteor Burst Communication Under Adverse Operating Conditions," Naval Postgraduate School Thesis, Mar. 1992.

Kenneth Davies, Ionospheric Radio Propagation. National Bureau of Standards Monograph 80, 1965, Section 8.4 (Meteor Scatter).

Simon Haykin, Adaptive Filter Theory, 4th ed., 2002, pp. 246-252.

Johnson and Jasik, Antenna Engineering Handbook, 2nd ed., Mc-Graw-Hill 1964, Section 14-3.

Theodore S. Rappaport. Wireless Communications: Principles and Practice. Prentice Hall, 1996, Section 5.5 and 5.8.

PCT International Search Report and Written Opinion, Application No. PCT/US2022/036306, mailed Nov. 7, 2022, 17 pages.

* cited by examiner

PRECISION TWO-WAY TIME TRANSFER OVER METEORBURST COMMUNICATIONS CHANNELS

CROSS-REFERENCE TO RELATED APPLICATIONS

This application claims priority to U.S. provisional patent application No. 63/219,062, filed Jul. 7, 2021, which is hereby incorporated by reference in its entirety.

GOVERNMENT RIGHTS

This invention was made with Government support under contract FA8650-13-C-7331 awarded by the Air Force Research Laboratory and under contract FA2487-18-D-0001, Delivery Order FA2487-19-F-1073 awarded by the United States Air Force. The Government has certain rights in the invention.

BACKGROUND

Micrometeorite ionization trails (MMITs) are created by billions of tiny meteorites entering Earth's atmosphere. The kinetic energy of these particles is high enough to ionize in the atmosphere immediately along the micrometeorite paths between 80 and 100 km altitude, generating long trails of electrons and ions. The electrons remain free and diffuse for up to hundreds of milliseconds before recombining with nitrogen. Radio-frequency radiation between 30-80 MHz impinging on the free electrons causes the electrons to oscillate and re-radiate energy in a dipole pattern via Thompson scattering. If RF radiation is transmitted upwards from the ground, a portion of the RF radiation may be scattered back down to the ground at a different location. MMITs can thus effectively act as RF channels, which may be used for radio communications between widely separated ground stations.

More particularly, the MMITs are known to occur randomly in time and location in an approximate altitude range of 80-100 km of the Earth's atmosphere, have lifetimes of random duration, and randomly-distributed trail lengths. These characteristics have been well-studied so it is possible to determine the statistical properties of MMIT channels in time and space. As such, an expected effectiveness RF communications via MMIT channels for various applications may be reasonably predicted. MMIT events are also sometimes referred to as "meteor bursts" and RF communications via MMIT channels is also sometimes referred to as "meteor burst communications."

SUMMARY

Clocks may be synchronized using various techniques. For high accuracy, global synchronization, a conventional approach may involve using the Global Positioning System (GPS) or other Global Navigation Satellite Systems (GNSS). However, this approach depends on an external system that can have limited availability in certain circumstances (e.g., due to radio interference, GPS system readiness, etc.). Alternative approaches can involve establishing a two-way communications link between two sites where clocks can be synchronized and then calibrated for the channel latency. However, such approaches require deployment of expensive, dedicated infrastructure (e.g., a terrestrial microwave link, and an optical fiber link, or a service lease on a satellite transponder). For example, the U.S. Naval Observatory provides a two-way time transfer service based on the use of satellite relays. This service uses specialized equipment to control highly accurate clocks (e.g., hydrogen masers) using satellite terminals, so it has a high installation cost and a high monthly service cost.

The above two examples of conventional approaches to global clock synchronization share drawbacks that make them unsuitable and/or impractical for a wide variety of clock synchronization applications that need or require low-cost, portable, and/or field-deployable solutions. The inventors have recognized that the drawbacks of conventional approaches are due, at least in part, to the cost and complexity of specialized equipment, and to reliance on the communications infrastructure of inter-site communications. The inventors have further recognized that the impediments to devising and deploying low-cost synchronization systems that are independent of infrastructure can be overcome by utilizing MMIT channels for communicating both two-way timing signals, as well as measurement data between pairs of ground stations. In particular, the inventors have significantly extended previous MMIT-based two-way time transfer (TWTT) demonstration techniques to design and develop systems and methods for continuous, highly accurate and precise distributed clock synchronization that can operate using only MMIT channels.

Accordingly, in one aspect, example embodiments may involve a client clock synchronization system (CSS) configured for communications with a server CSS over micrometeorite ionization trail (MMIT) channels. MMIT channels are known to be distributed randomly in both time and location within the Earth's ionosphere, and have lifetimes distributed randomly in duration. The client CSS may include: an antenna; a transceiver coupled with the antenna and configured for switching between transmit and receive modes; and a computing system coupled with the transceiver and with a client clock. The computing system may be configured for carrying out operations including: via the antenna, with the transceiver in transmit mode, transmitting a sequence of radio-frequency (RF) pulses to the server CSS over a first multiplicity of MMIT channels, wherein transmission information indicating a respective local transmit identifier and respective transmission time of each transmitted RF pulse is maintained at the client CSS; via the antenna, with the transceiver in receive mode, receiving a first plurality of RF pulses from the server CSS over a second multiplicity of MMIT channels, each received RF pulse consecutively following one of the transmitted RF pulses of the sequence, wherein reception information indicating a respective local receive identifier and arrival time of each received RF pulse is maintained at the client CSS; via the antenna, with the transceiver in receive mode, receiving measurement data from the server CSS over a third multiplicity of MMIT channels, wherein the measurement data comprise, for each of a second plurality of RF pulses received by the server CSS, a respective remote receive identifier, a respective arrival time at the server CSS, and a respective signal-to-noise (SNR) measurement; correlating the measurement data with the transmission information to identify respective transmitted RF pulses of the sequence with respective RF pulses of the second plurality received by the server CSS at the respective arrival times with the respective SNR measurements; correlating the transmission times of the identified respective transmitted RF pulses with the reception information to determine a third plurality of respective RF-pulse pairs, wherein each respective RF-pulse pair comprises (i) a particular transmitted RF pulse that was received by the server CSS over a particular MMIT channel and (ii) a particular RF pulse that was received from the server CSS over the same particular MMIT channel and consecutively following transmission of the particular transmitted RF pulse; applying two-way time transfer (TWTT) analysis to timing data of each RF-pulse pair to compute a set of time offsets of the client clock with respect to a server clock of the server CSS; and applying an analytical model of clock drift to the set of time offsets to synchronize the client clock with the server clock.

In another aspect, example embodiments may involve a server clock synchronization system (CSS) configured for communications with a client CSS over micrometeorite ionization trail (MMIT) channels. MMIT channels are known to be distributed randomly in both time and location within the Earth's ionosphere and have lifetimes distributed randomly in duration. The server CSS may include: an antenna; a transceiver coupled with the antenna and configured for switching between transmit and receive modes; and a computing system coupled with the transceiver and with a server clock. The computing system may be configured for carrying out operations including: a computing system coupled with the transceiver and with a client clock, and configured for carrying out operations including: via the antenna, with the transceiver in transmit mode, transmitting a sequence of radio-frequency (RF) pulses to the client CSS over a first multiplicity of MMIT channels; via the antenna, with the transceiver in receive mode, receiving a first plurality of RF pulses from the client CSS over a second multiplicity of MMIT channels, each consecutively following one of the transmitted RF pulses of the sequence, wherein reception information indicating a respective local receive identifier and arrival time of each received RF pulse is maintained at the client CSS; via the antenna, with the transceiver in receive mode, transmitting measurement data to the client CSS over a third multiplicity of MMIT channels, wherein the measurement data comprise, for each of a sub-plurality of the first plurality of RF pulses received by the server CSS, a respective local receive identifier, the respective arrival time at the server CSS, and a respective signal-to-noise (SNR) measurement.

In yet another aspect, example embodiments may involve a method of clock synchronization carried out by a client synchronization system (CSS) configured for communications with a server CSS over micrometeorite ionization trail (MMIT) channels. MMIT channels are known to be distributed randomly in both time and location within the Earth's ionosphere, and have lifetimes distributed randomly in duration. The method may involve operations including: via an antenna, with a transceiver in transmit mode, transmitting a sequence of radio-frequency (RF) pulses to a server CSS over a first multiplicity of MMIT channels, wherein transmission information indicating a respective local transmit identifier and respective transmission time of each transmitted RF pulse is maintained at the client CSS; via the antenna, with the transceiver in receive mode, receiving a first plurality of RF pulses from the server CSS over a second multiplicity of MMIT channels, each received RF pulse consecutively following one of the transmitted RF pulses of the sequence, wherein reception information indicating a respective local receive identifier and arrival time of each received RF pulse is maintained at the client CSS; via the antenna, with the transceiver in receive mode, receiving measurement data from the server CSS over a third multiplicity of MMIT channels, wherein the measurement data comprise, for each of a second plurality of RF pulses received by the server CSS, a respective remote receive identifier, a respective arrival time at the server CSS, and a respective signal-to-noise (SNR) measurement; correlating the measurement data with the transmission information to identify respective transmitted RF pulses of the sequence with respective RF pulses of the second plurality received by the server CSS at the respective arrival times with the respective SNR measurements; correlating the transmission times of the identified respective transmitted RF pulses with the reception information to determine a third plurality of respective RF-pulse pairs, wherein each respective RF-pulse pair comprises (i) a particular transmitted RF pulse that was received by the server CSS over a particular MMIT channel and (ii) a particular RF pulse that was received from the server CSS over the same particular MMIT channel and consecutively following transmission of the particular transmitted RF pulse; applying two-way time transfer (TWTT) analysis to timing data of each RF-pulse pair to compute a set of time offsets of the client clock with respect to a server clock of the server CSS; and applying an analytical model of clock drift to the set of time offsets to synchronize a client clock of the client CSS with a server clock of the server CSS.

In still another aspect, example embodiments may involve an article of manufacture including a non-transitory computer-readable medium, having stored thereon program instructions that, when executed by one more processors of a system, cause the system to carry out various operations of the example methods and/or steps of the above embodiments.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
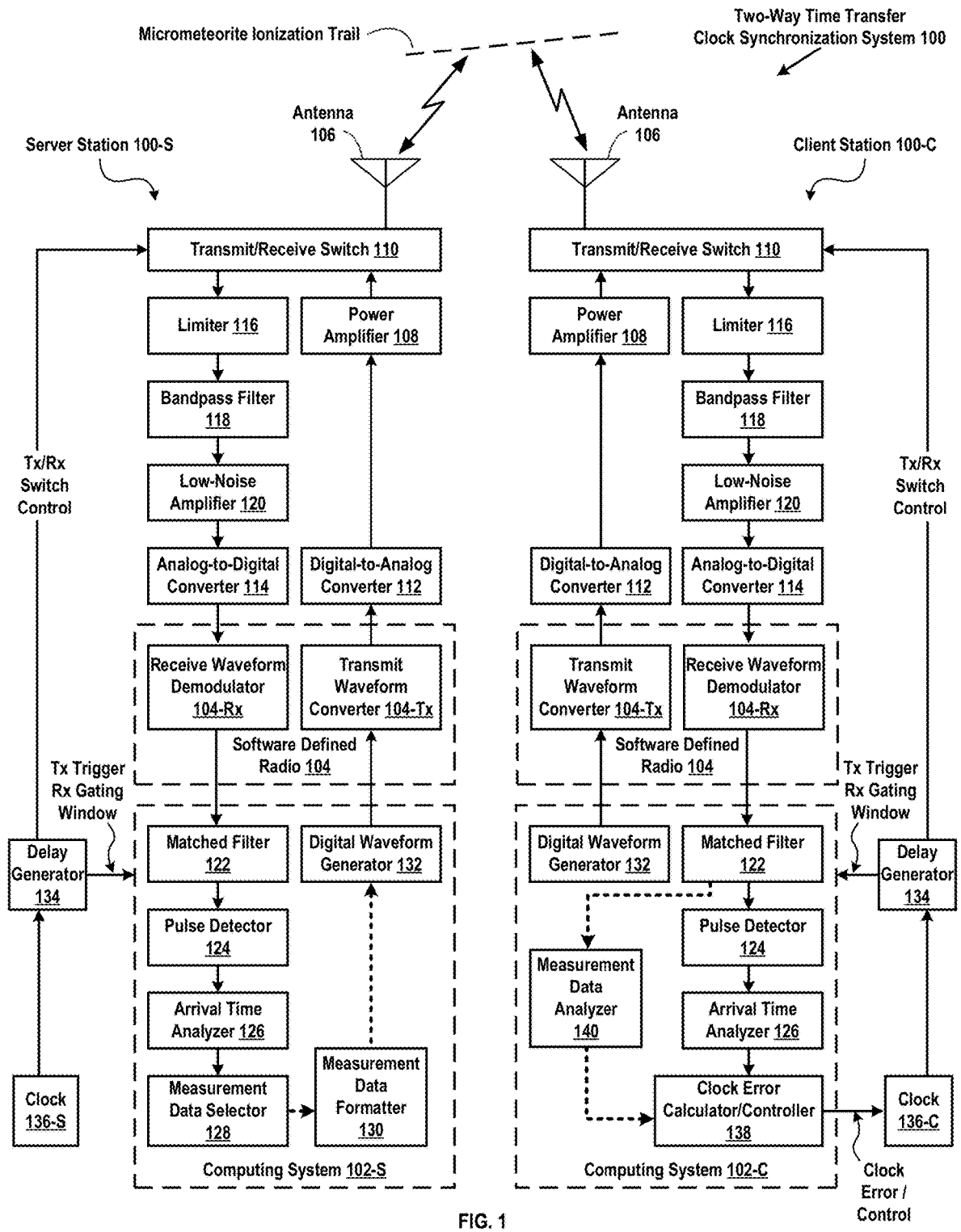
FIG. 1 is a simplified block diagram showing components of a clock synchronization system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Example Meteroburst-Based Two-Way Time Transfer Clock Synchronization System

For two hypothetically, perfectly synchronized clocks, both would have identical phases (e.g., time settings) and identical frequencies. In practice, imperfect synchronization may lead to a time offset between two clocks that will grow with time if the frequencies are also not perfectly identical. Non-identical frequencies may also be referred to as relative frequency drift, and may result in time drift between two clocks. Synchronization of two clocks generally considers one of the clocks to be a reference, and aims to align the phase and frequency of the other clock with the reference. A single reference clock may also be used to synchronize multiple other clocks. Note that the term "phase" used in comparing two clocks may be considered as analytically related to time instants as measured by the clocks.

In applications requiring nanosecond-level synchronization, frequency differences between oscillators can be a significant factor. For example, a frequency drift of just one part in $10^{12}$ can result in a time offset of 100 s of nanoseconds (one nanosecond=$10^{-9}$ seconds) per hour. To maintain time synchronization to within a few nanoseconds, then, even high-precision oscillators, such as rubidium standards, can introduce unacceptable errors if left uncorrected even over relatively short time intervals. This is just one illustration of the need for synchronization to account for both time and frequency drift in high accuracy and precision applications.

Example embodiments are describe herein of systems and methods for synchronization between a server clock and one or more client clocks by way of exchange of timing signals and measurement data transmitted at radio frequencies over radio-frequency (RF) channels created by micrometeorite ionization trails (MMITs) in the Earth's atmosphere. More particularly, example systems and methods use two-way time transfer (TWTT) techniques over MMIT channels to achieve clock synchronization. The server clock may be a reference clock and be part of a server station, and the client clocks may be part of respective client stations. For purposes of discussion herein, only one client clock and client station will be considered. However, the principles and operation described may be straightforwardly extended to multiple client clocks and client stations. In an example scenario, the server and client station may both be ground stations that are widely separated geographically. A non-limiting example ground distance between a server and client stations is 300-500 km, though other distances are possible. An approximate maximum range may be determined from a simplified geometry of two separated ground stations and a reflection point between them at an altitude typical of MMITs.

As described in detail below, TWTT over MMIT channels entails exchange between a server and a client station of pairs of timing signals over the same MMIT channel. From various studies, it is known that MMITs are random, transient events, and thus, so are potential RF channels that they create. As such, opportunities for the two stations to exchange particular RF signals on the same MMIT channel are similarly random, transient opportunities. Based on statistical distributions of MMIT occurrences, properties, and characteristics, and accounting for certain aspects of operating principles of the system, as described below, it may be predicted that there can be roughly 20-50 MMIT channels per hour useable for the exchange of timing signals. From among these opportunities, measurement data from only a subset of successfully exchanged timing signals may ultimately be selected and applied in TWTT analysis, for reasons explained below.

In accordance with example embodiments, the measurement data from the subset of exchanged timing signals used in the TWTT analysis may intermittently yield a derived time offset (or "time delta") estimate between the server and client clocks. Due to the temporally random nature of MMIT channels, as well as selection of the subset of measurement data of exchanged timing signals, the derived time offset estimates may tend to be sparsely and irregularly distributed in time, and may be thought of as a sort of stream of intermittent the "time-delta measurements." In further accordance with example embodiments, additional analytical techniques may be applied to the time-delta measurements to drive a control model/algorithm that may continuously (or nearly so) update the client clock to maintain synchronization with the server clock. In particular, analytical techniques have been devised that account for the sparse and irregular character of the time delta measurements.

In a further aspect of example embodiments, arrival time measurements of timing signals received at the server station that form the measurement data used in the TWTT analysis may be transmitted to the client station also over MMIT channels. Doing so enables the overall system to be entirely independent of any communications infrastructure and/or expensive time-distribution technologies. Advantageously, this allows a system made up of a server station and client station to be less expensive than one that relies on such infrastructure and/or technologies, as well as be field-deployable. Other benefits accrue from the essentially standalone implementation as well. It should be understood that other embodiments could nevertheless connect or integrate with communications infrastructure and/or time-distribution systems, at least for purposes of testing and/or calibration, for example. The basic principles of TWTT over MMIT channels that could be used in such alternative embodiments remain the same.

An example system architecture is described below, followed by a more general description of example computing systems and devices, and example configurations of computing systems and devices. Subsequent sections describe example operation and methods.

A. Example System Architecture

FIG. 1 is a simplified block diagram showing components of an example two-way time transfer (TWTT) clock synchronization system 100 configured for communication of timing signals and data over radio-frequency (RF) channels created by micrometeorite ionization trails (MMITs) in the Earth's atmosphere, in accordance with example embodiments. The block diagram of FIG. 1 may also be considered as depicting aspects of an operational architecture of the TWTT clock synchronization system 100. Some of the components of the TWTT clock synchronization system 100 may be structural, such as amplifiers and filters, and others may be identified in terms of their operation or function. Operational and/or functional components could be implemented as software and/or hardware and/or firmware, for example, and may sometimes be referred to herein as "modules" for the purpose of the present discussion.

The TWTT clock synchronization system 100 can also include one or more connection mechanisms that connect various components within the system 100. By way of example, the connection mechanisms are depicted as arrows between components. The direction of an arrow may indicate a direction of information flow, though this interpretation should not be viewed as limiting. In this disclosure, the term "connection mechanism" means a mechanism that connects and facilitates communication between two or more components, devices, systems, or other entities. A connection mechanism can include a relatively simple mechanism, such as a cable or system bus, and/or a relatively complex mechanism, such as a packet-based communication connection. In some instances, a connection mechanism can include a non-tangible medium, such as in the case where the connection is at least partially wireless. A connection mechanism may also include programmed communication between software and/or hardware modules or applications, such as application program interfaces (APIs), for example.

While an aspect of the example embodiments may be to avoid dependence on communications infrastructure, the TWTT clock synchronization system 100 may still include capabilities for such communications, at least for testing and/or development purposes, for example. Thus, in this disclosure, in addition to direct connections between components, a connection may in some instances also be indirect, passing through and/or traversing one or more entities, such as a router, switcher, or other network device. Likewise, in this disclosure, communication (e.g., a transmission or receipt of data), while generally direct, may in some circumstances be indirect.

As shown, the example TWTT clock synchronization system 100 includes a server station 100-S, depicted on the left side of FIG. 1, and a client station 100-C, depicted on the right side. The client station 100-C may be an example of what may more generally be referred to as a "client clock synchronization system" or "client CSS." Likewise, the server station 100-S may be an example of what may more generally be referred to as a "server clock synchronization system" or "server CSS."

In addition to the two stations, FIG. 1 also includes a conceptual illustration of an MMIT channel, depicted as a sloping dashed line at the top of the figure, and labeled "micrometeorite ionization trail." Bi-directional zig-zag arrows between antennas 106 of the stations and the MMIT channel represent RF signals transmitted in both directions between the two stations over a single MMIT channel. As mentioned above, MMITs—and thus potential RF channels that they create—are random, transient events. As such, opportunities for the two stations to exchange particular RF signals on the same MMIT channel are similarly random, transient opportunities. Some of the operations described below are carried out regardless of whether any MMIT channel happens to be available, and others are carried out specific to one or more determinations that an MMIT channel has been successfully utilized for RF signal transmission from one or both stations to the other.

Both stations 102-S and 102-C may be largely identical in terms of the components shown in FIG. 1, although, as described below, some aspects of their respective operations may differ. Some common features and components of the server station 100-S and the client station 100-C include an antenna 106, a transmit/receive switch 110 (e.g., transceiver), a power amplifier 108, a digital-to-analog converter (DAC) 112, a software-defined radio 104 having a transmit waveform converter 104-Tx and a receive waveform demodulator 104-Rx, an analog-to-digital converter (ADC) 114, a low-noise amplifier 120, a bandpass filter 118, and a limiter 116. Both stations also include a delay generator 134 and a clock, 136-S for the server station and 136-C for the client station. While the clock hardware may be identical for both stations, such as a rubidium time/frequency standard, the two clocks are labeled distinctively to indicate a general scenario of lack of synchronization between them that system operations aim to correct.

In example embodiments, the client clock may include, or be integrated in, a device that enables the clock to be adjusted. In particular, clock adjustments may include setting the phase (i.e., current time) and frequency of an oscillator used to drive the clock. The ability to adjust the clock in this manner may allow the clock to be "steered" according to correction measurements, as described in more detail below. In some example embodiments, server clock may also include the same or similar means for adjustment. It should be understood that there may be a variety of clock hardware/software/firmware implementations that may be used in example embodiments. Non-limiting examples of such variations include fully hardware implementations with hardware-controllable/adjustable oscillators, and software implementations with programmable control/adjustment of timing signals.

Both stations further include respective computing systems, 102-S for the server and 102-C for the client station. The computing systems 102-S and 102-C may include, among other features and components described by way of example below in connection with FIG. 2, a processor and memory storing instructions that, when executed by the processor, cause the computing systems to carry out various operations and functions described herein. While the two computing systems 102-S and 102-C may be largely the same, each may implement particular operations and/or functions specific to their respective stations. Aside from a processor and memory, common aspects of both computing systems include a matched filter 122, a pulse detector 124, an arrival time analyzer 126, and a digital waveform generator 132. In addition, the server computing system 102-S includes a measurement data selector 128 and a measurement data formatter 130. Likewise, the client computing system 102-C further includes a measurement data analyzer 140 and a clock error calculator/controller 138. The various components of the two computing systems may themselves be implemented as hardware, software, and/or firmware, for example.

The TWTT clock synchronization system 100 may include additional components besides those described above. Some embodiments may also include different components as well.

General operation of the server and client stations 100-S and 100-C may be illustrated by way of example as follows. As described in detail below, each station may be configured to transmit RF pulse signals in continuous (or nearly-continuous) regular, periodic pulse repetition intervals (PRIs), each of which includes one transmit window followed by one receive window. During each transmit window each station may operate in transmit mode to transmit an RF pulse signal, and during each receive window each station may operate in a receive mode to listen for, and if present (i.e., received) detect, a received RF pulse signal. As such, each station may be configured to operate in periodically alternating transmit and receive modes aligned with respective sequences of PRIs. The periodicity of the PRIs at each station may be controlled by periodic timing pulses emitted by the respective clocks 136-S and 136-C.

In accordance with example embodiments, the delay generator 134 in each station may be configured to ensure that the transmit and receive windows of each PRI are of specified durations and properly aligned with PRI boundaries. In addition, as also described in detail below, the relative timing of the PRIs at the server and client stations may be arranged such that the receive windows at each station are (at least approximately) aligned with time intervals during which pulses transmitted from the other station would be expected to be received over available MMIT channels. Thus, in further accordance with example embodiments, the delay generator 134 in each station may also be configured to introduce an appropriate time offset between PRIs at the two stations so as to achieve interleaving of transmitted and (when present) received RF pulse signals at each station. The time offset between PRIs at the two stations may also be described as staggered transmit windows at the two stations. It should be noted that the time offset between PRIs at the two stations may be configured deliberately to achieve transmit and receive interleaving at each station, and should not be confused with a time offset between the server clock 135-S and client clock 136-C that represents a synchronization error that system operation aims to correct.

In the example illustrated in FIG. 1, each delay generator 134 periodically emits alternating Tx triggers and Rx gating windows to the respective computing system 102-S or 102-C to cause either the digital waveform generator 132 to generate pulse waveforms for transmission, or the matched filter 122 to attempt detection of potentially-received RF pulses. Each delay generator 134 also periodically emits corresponding alternating Tx/Rx switch control signals to the respective transmit/receive switch 110 to cause it to switch between transmit and receive modes of each PRI in coordination with transmit and receive operations of the respective computing system 102-S or 102-C. Note that the transmit/receive switch 110, in coordination with the power amplifier 108, may be considered a transceiver.

In transmit mode, the transmit waveform converter 104-Tx of each station generates a transmit waveform from the input of the respective digital waveform generator 132, and supplies the transmit waveform to the respective DAC 112. The resulting analog signal is amplified by the respective power amplifier 108 and input to the respective transmit/receive switch 110, which, in transmit mode, transmits the resulting RF pulse via the respective antenna 106. In an example embodiment, the amplifier 108 may be or include a 1.5 kW RF amplifier; that is, it may produce a 1.5 kW RF signal for transmission. Other amplifier powers may be used as well.

While transmit mode operations may be configured to always result in transmission of an RF pulse (or, as described below, data transmission in data communications mode), receive mode operations generally operate whether or not an actual pulse is received at the respective antenna 106. Any pulse (or data communication) received during receive mode and matching the matched filter 122 will be detected, but not all receive modes are necessarily temporally-coincident with a received pulse, and thus not all receive modes will yield a pulse detection (or data communication). But receive mode operations up through pulse detection are generally the same, regardless of whether or not a pulse (or data communication) is actually detected.

In receive mode, the respective transmit/receive switch 110 passes its output to the respective limiter 116, which may reduce the power of the input signal as necessary before passing the input signal to the respective low-noise amplifier 120. The amplified signal of the respective low-noise amplifier 120 is input to the ADC 114, which supplies the digitized signal to the respective receive waveform demodulator 104-Rx. More specifically, the output of the ADC 114 may be digitized samples of the amplified signal produced at a particular sampling rate. In an example embodiment, a sampling rate of 25 MHz is used. Samples may be continually collected for the duration of receive mode operation. The respective matched filter 122 is next applied to the output, demodulated waveform, and the respective pulse detector 124 evaluates the matched filter output to determine if a pulse has been detected. This evaluation may involve a threshold test for detection, for example. It should be understood that other sampling rates could be used. A non-limiting example of a range of sampling rates is 10 MHz to 100 MHz.

If a pulse is detected, it may be analyzed by the respective arrival time analyzer 126 to determine the pulse arrival time as measured with respect to timekeeping of the respective clock 136-S or 136-C. In accordance with example embodiments, a form of interpolation may be applied to the digitized samples to derive a time position of the peak of each detected pulse with a higher time resolution than the sampling rate. In addition, the arrival time may be measured with respect to the start of a receive window aligned with the start having the switch in receive mode, as describe below.

At this point, example operations of the server station 102-S and client station 102-C may differ in some aspects. More particularly, the server station 102-S may be configured to transmit certain measurement data, including pulse arrival times and identifications of the PRIs in which the pulses were received, to the client station 102-C, while operating in a communications mode. Correspondingly, the client station 102-C may be configured to receive the transmitted measurement data, also while operating in a communications mode, and the correlate PRIs of RF pulses at the server station with PRIs of RF pulses transmitted to the server station. Such correlations may be used to identify RF pulse pairs that each include one pulse transmitted by each station and received by the other over the same MMIT channel. The measured arrival times of the two pulses in each pair can be used in a TWTT analysis to determine a time offset error (or time delta) between the two clocks 136-S and 136-C at a time associated with the pulse transmissions. After determining the time offset error, the offset may be sequentially processed by the client station 100-C to synchronize its clock 136-C with the clock 136-S of the server station 100-S.

In accordance with example embodiments, data transmission used for transmitting measurement data from the server station 100-S to the client station 100-C during the data communications mode may also utilize MMIT channels. As such, the volume of measurement data that can be transmitted may be limited in part by the transient, random availability of MMIT channels. Thus, in typical operation, there may be more arrival time measurement data collected by the server station 100-S than can be ultimately transmitted to the client station 100-C. This circumstance may be addressed by judicious selection by the server station 100-S of which measurement data to transmit to the client station 100-C.

In further accordance with example embodiments, the measurement data selector 128 may implement one or another form of selection algorithm to make this data selection. The selected measurement data may then be formatted by the measurement data formatter 130 for transmission to the client station 100-C using the data communications mode. The arrows representing the selected data input to the measurement data formatter, and the formatted data input to the digital waveform generator 132 are depicted with dotted lines to signify data communications operations.

At the client station 100-C during data communications operations, received measurement data may be input to the measurement data analyzer 140. As noted, measurement data from the server station 100-S may include arrival times RF pulses, as well as associated PRI identifiers and signal-to-noise (SNR) measurements of the received pulses. The measurement data analyzer 140 may use the PRI identifiers to identify each pulse reported as received by the server station 100-S with its corresponding RF transmission from the client station 100-C. The measurement data analyzer 140 may then input the results to the clock error calculator/controller 138, which may attempt to pair each transmitted RF pulse known to be received by the server station 100-S with an RF pulse received from the server station 100-S during the same PRI—that is, during the receive window immediately following the transmit window of the RF pulse received by the server station 100-S. While not every transmitted RF pulse received by the server station 100-S will necessarily pair with an RF pulse received from the server station 100-S during the same PRI, those that do then correspond to exchanged timing signals carried over the same MMIT channel.

As mentioned above, and described in more detail below, the respective arrival times at the server station 100-S and the client station 100-C of each such pair may be used in TWTT analysis to derive a time offset between the server clock 136-S and client clock 136-C as a time associated with the common PRI of the pulse pair. The clock error calculator/controller 138 may intermittently output derived time offsets that, in turn, may be input to a control algorithm to generate a clock error/control signal that may be applied to "steer" or correct any time and/or frequency drift of the client clock 136-C, as indicated. Further, the limited and random availability of MMIT channels for data transmissions may also result in latency between actual arrival times and when they are reported and used to derive the corresponding time offsets. The clock error calculator/controller 138 may include features or functions for compensating not only the sparse and irregular nature of the time-delta measurements, but also for the latency as well. In an example embodiment, clock error calculator/controller 138 may include or incorporate sequential state estimator, such as a Kalman filter.

The arrows representing the matched filter output to the measurement data analyzer 140 and the input to the clock error calculator/controller 138 are depicted with dotted lines to signify data communications and measurement analysis operations. It should be noted that while the client station 100-C may receive measurement data while operating in data communications mode, the data analysis operations that, for example, form RF pulse pairs and computes clock error corrections and control, may operate in parallel with RF pulse signal transmissions and receptions.

In accordance with example embodiments, the server station 100-S and the client station 100-C may both transmit and receive RF pulses at the same RF frequency. In an example configuration, each pulse may be centered in frequency at 40 MHz and span 20 MHz. Other frequencies and frequency bandwidths could be used as well. In further accordance with example embodiments, both stations may operate in data communications mode using the same frequency used for RF pulse transmissions. Such operations may be carried out using time multiplexing of MMIT channels. An example arrangement of time multiplexing is described below.

In other example embodiments, timing signals and data communications may use different frequencies. This could enable concurrent time and data transmissions using frequency division multiplexing. Such embodiments may also involve additional hardware to support multiple frequency channels, as well as possibly shared RF power transmission budget between RF frequency channels. While there may be various tradeoffs between different embodiments, the general principles of TWTT synchronization using MMIT channels, as described herein, are largely the same for all such embodiments, and operations of different embodiments may be adapted to account for different transmission/reception schemes.

In some example embodiments, frequency division multiplexing could be used for client pulse transmissions and server pulse transmissions. This could allow for concurrent pulse transmissions by both the client and server systems. Again, such embodiments may also involve additional hardware to support multiple frequency channels, as well as possibly shared RF power transmission budget between RF frequency channels.

It should be understood that example embodiments using more, fewer, and/or different components and modules than those illustrated by way of example in FIG. 1 configured. To the extent that various functions and operations described could be carried out, at least partly, by software instructions, some of the described components and modules could be merged, and/or some functions or operations could be implemented in different modules than those described. As just one example, the pairing operation described in connection with the clock error calculator controller 138 could be carried out by a module or component that combines the arrival time analyzer 140 and the measurement data analyzer 126. As another example, the clock steering operations could be carried out a clock device that includes software capabilities to implement the clock error calculator controller 138. Other alternative configurations may be possible as well.

B. Example Computing Devices and Cloud-Based Computing Environments

Figure 2:
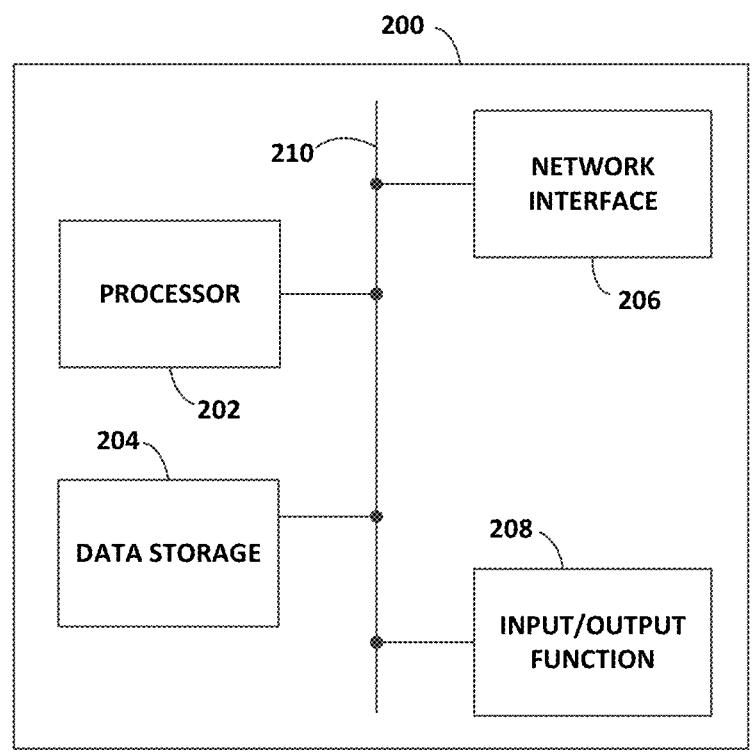
FIG. 2 illustrates a schematic drawing of a computing device, according to an example embodiment.

FIG. 2 is a simplified block diagram exemplifying a computing device 200, illustrating some of the functional components that could be included in a computing device arranged to operate in accordance with the embodiments herein. Example computing device 200 could be a personal computer (PC), laptop, server, or some other type of computational platform. For purposes of simplicity, this specification may equate computing device 200 to a server from time to time, and may also refer to some or all of the components of computing device 200 as a "processing unit." Nonetheless, it should be understood that the description of computing device 200 could apply to any component used for the purposes described herein.

In this example, computing device 200 includes a processor 202, a data storage 204, a network interface 206, and an input/output function 208, all of which may be coupled by a system bus 210 or a similar mechanism. Processor 202 can include one or more CPUs, such as one or more general-purpose processors and/or one or more dedicated processors (e.g., application-specific integrated circuits (ASICs), graphical processing units (GPUs), digital signal processors (DSPs), network processors, etc.).

Data storage 204, in turn, may comprise volatile and/or non-volatile data storage and can be integrated in whole or in part with processor 202. Data storage 204 can hold program instructions, executable by processor 202, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 204 may contain program instructions, perhaps stored on a non-transitory, computer-readable medium, executable by processor 202 to carry out any of the methods, processes, or functions disclosed in this specification or the accompanying drawings.

Network interface 206 may take the form of a wireline connection, such as an Ethernet, Token Ring, or T-carrier connection. Network interface 206 may also take the form of a wireless connection, such as IEEE 802.11 (Wifi), BLUETOOTH®, or a wide-area wireless connection. However, other forms of physical layer connections and other types of standard or proprietary communication protocols may be used over network interface 206. Furthermore, network interface 206 may comprise multiple physical interfaces.

Input/output function 208 may facilitate user interaction with example computing device 200. Input/output function 208 may comprise multiple types of input devices, such as a keyboard, a mouse, a touch screen, and so on. Similarly, input/output function 208 may comprise multiple types of output devices, such as a screen, monitor, printer, or one or more light-emitting diodes (LEDs). Additionally or alternatively, example computing device 200 may support remote access from another device, via network interface 206 or via another interface (not shown), such as a universal serial bus (USB) or high-definition multimedia interface (HDMI) port.

In some embodiments, one or more computing devices may be deployed in a networked architecture. The exact physical location, connectivity, and configuration of the computing devices may be unknown and/or unimportant to client devices. Accordingly, the computing devices may be referred to as "cloud-based" devices that may be housed at various remote locations.

Figure 3:
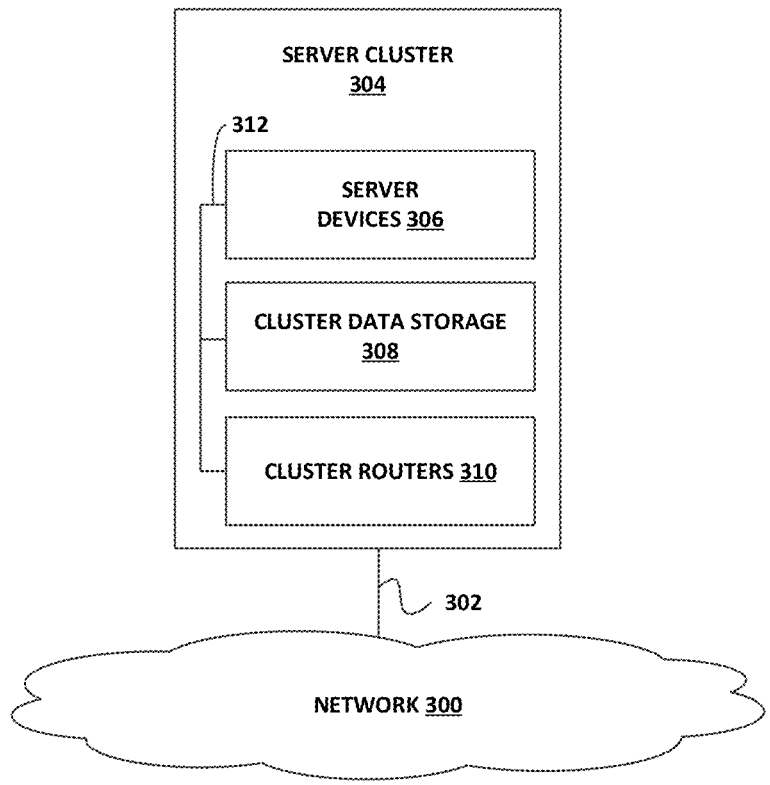
FIG. 3 illustrates a schematic drawing of a networked server cluster, according to an example embodiment.

FIG. 3 depicts a cloud-based server cluster 304 in accordance with an example embodiment. In FIG. 3, functions of computing device 200 may be distributed between server devices 306, cluster data storage 308, and cluster routers 310, all of which may be connected by a local cluster network 312. The number of server devices, cluster data storages, and cluster routers in server cluster 304 may depend on the computing task(s) and/or applications assigned to server cluster 304.

For example, server devices 306 can be configured to perform various computing tasks of computing device 200. Thus, computing tasks can be distributed among one or more of server devices 306. To the extent that these computing tasks can be performed in parallel, such a distribution of tasks may reduce the total time to complete these tasks and return a result.

Cluster data storage 308 may be data storage arrays that include disk array controllers configured to manage read and write access to groups of hard disk drives and/or solid-state drives. The disk array controllers, alone or in conjunction with server devices 306, may also be configured to manage backup or redundant copies of the data stored in cluster data storage 308 to protect against disk drive failures or other types of failures that prevent one or more of server devices 306 from accessing units of cluster data storage 308.

Cluster routers 310 may include networking equipment configured to provide internal and external communications for the server clusters. For example, cluster routers 310 may include one or more packet-switching and/or routing devices configured to provide (i) network communications between server devices 306 and cluster data storage 308 via cluster network 312, and/or (ii) network communications between the server cluster 304 and other devices via communication link 302 to network 300.

Additionally, the configuration of cluster routers 310 can be based at least in part on the data communication requirements of server devices 306 and cluster data storage 308, the latency and throughput of the local cluster network 312, the latency, throughput, and cost of communication link 302, and/or other factors that may contribute to the cost, speed, fault-tolerance, resiliency, efficiency and/or other design goals of the system architecture.

As noted, server devices 306 may be configured to transmit data to and receive data from cluster data storage 308. This transmission and retrieval may take the form of SQL queries or other types of database queries, and the output of such queries, respectively. Additional text, images, video, and/or audio may be included as well. Furthermore, server devices 306 may organize the received data into web page or web application representations. Such a representation may take the form of a markup language, such as the hypertext markup language (HTML), the extensible markup language (XML), or some other standardized or proprietary format. Moreover, server devices 306 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® or other languages may be used to facilitate generation of web pages and/or to provide web application functionality.

II. Example Operations

Figure 4:
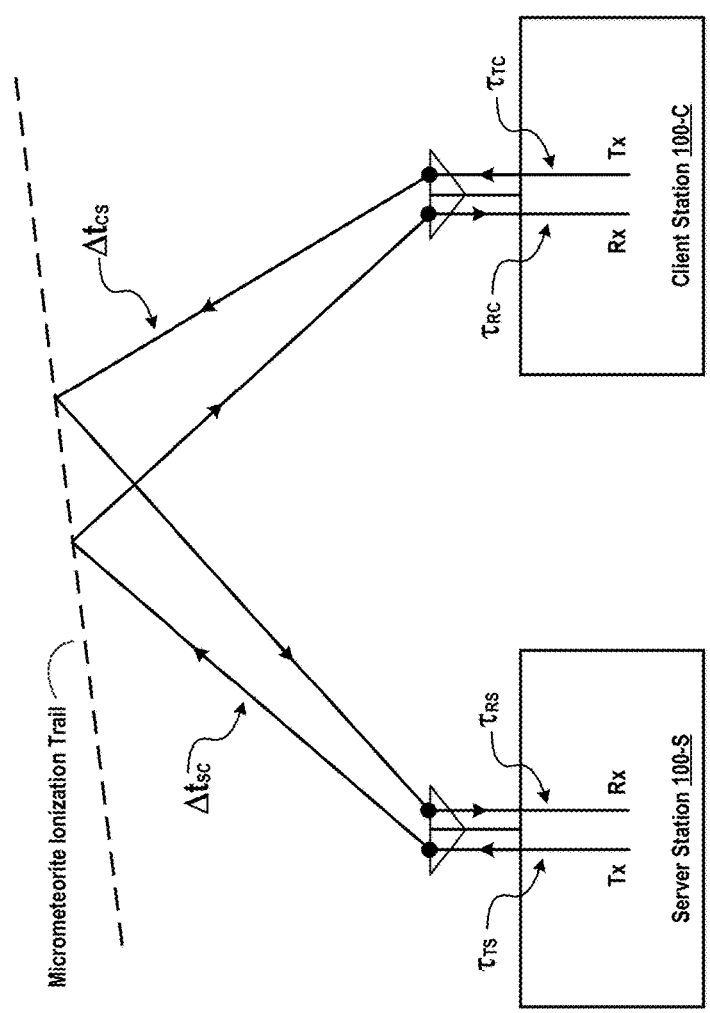
FIG. 4 illustrates timing and delay characteristics of an example operational scenario of a clock synchronization system, in accordance with example embodiments.

FIG. 4 illustrates timing and delay characteristics of an example operational scenario of clock synchronization with the TWTT clock synchronization system 100, using time signals transmitted over an MMIT channel, in accordance with example embodiments. More particularly, FIG. 4 depicts time delays of a signal transmitted from the server station 100-S and received by the client station 100-C, and another signal transmitted by the client station 100-C and received by the server station 100-S. Each signal path is shown as being effectively reflected by a micrometeorite ionization trail, represented by a sloped dashed line, acting as an RF channel. As described above, the ionization trail is made up of free electrons that re-radiate impinging RF radiation via Thompson scattering, such that a portion of impinging RF radiation from one station is scattered toward the other station. Scattering may therefore have the effect of reflecting at least a portion of incident RF radiation, such that the angle of reflection equaling the angle of incidence.

As indicated, each signal path includes an equipment delay associated with transmit processing, a propagation path delay from one station to the other, and an equipment delay associated with receive processing. In consideration of the discussion of FIG. 1, the equipment delay associated with transmit processing could correspond to a time between a clock pulse that triggers the digital waveform generator 132 and actual radiation of the amplified RF signal by the antenna 106. Similarly, the equipment delay associated with receive processing could correspond to a time between receiving an RF signal by the antenna 106 and pulse detection by the matched filter 122. As indicated in FIG. 4, the transmit processing delays are $\tau_{TS}$ and $\tau_{TC}$ at the server and client stations, respectively; and the receive processing delays are $\tau_{RS}$ and $\tau_{RC}$ at the server and client stations, respectively. The propagation path delay from the antenna of the server station to the antenna of the client station is $\Delta t_{SC}$; and the propagation path delay from the antenna of the client station to the antenna of the server station is $\Delta t_{CS}$.

Assuming an instantaneous time offset $\delta$ between the server clock and client clock, and taking the measured arrival times of received RF pulses at the server station and client station to be $T_{arr-S}$ and $T_{arr-C}$, respectively, it is straightforward to show that the arrival times are related to the time offset by the expressions:

$$T_{arr-S} = \Delta t_{CS} + \tau_{TC} + \tau_{RS} + \delta \quad (1a)$$

$$T_{arr-C} = \Delta t_{SC} + \tau_{TS} + T_{RC} - \delta \quad (1b)$$

These equations may be solved for $\delta$, yielding:

$$\delta = \tfrac{1}{2}[T_{arr-S} - T_{arr-C} + (\Delta t_{SC} - \Delta t_{CS}) + (\tau_{TS} - \tau_{TC}) + (\tau_{RC} - \tau_{RS})] \quad (2)$$

Equation (2) is one general form of a two-way time transfer equation. For application with MMIT channels and identical equipment delays it may be simplified to an expression involving only the arrival times.

More specifically, for server and client station implementations that use the same transmit and receive componentry, it may be reasonably assumed that the corresponding equipment delays of both stations are the same. In addition, for both paths scattered by the same MMIT, it may be reasonably assumed that the path delays of both signals are effectively the same. With these assumptions, the time offset $\delta$ may be expressed simply as:

$$\delta \approx \tfrac{1}{2}[T_{arr-S} - T_{arr-C}] \quad (3)$$

It may be noted that the assumption that the propagation path delays are nearly equal may appear to neglect possible drift of the physical location of an MMIT over the course of the two transmissions, which could, in principle, cause the two paths to differ, and thus their respective delays to differ. However, from previous studies of MMIT-based RF communications, it is known that path delays of MMIT channels may change at a rate typically on the order of $10^{-7}$ second per second. For a time interval between reflections of one millisecond, the difference in propagation delays of the two paths would be on the order of 0.1 nanosecond. This may be small enough, therefore, to warrant the assumption that the two propagation path delays are the same, and their difference in equation (2) may be neglected.

Figure 5A:
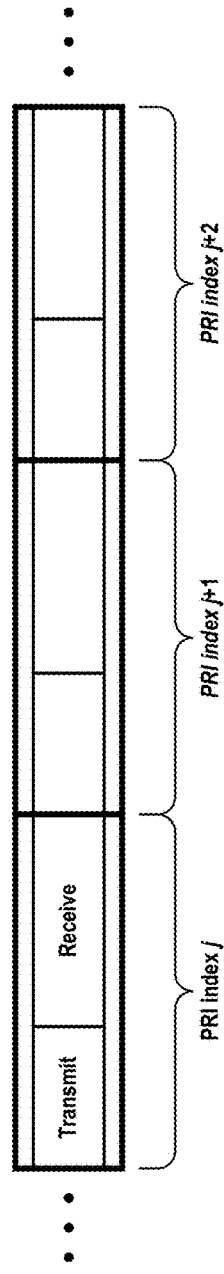
FIG. 5A illustrates example transmit and receive modes of example pulse repetition intervals of an example clock synchronization system, in accordance with example embodiments.

As described above, in example embodiments the server and client stations are configured to transmit and receive in periodic PRIs. FIG. 5A illustrates the structure of example pulse repetition intervals, in accordance with example embodiments. Three PRIs are depicted, with leading and trailing ellipses indicating a possibly longer sequence. Each PRI has a transmit window followed by a receive window. In an example embodiment, PRIs have a period of 25 ms; each transmit window is 10 ms and each receive window is 15 ms. These parameters correspond to 40 PRIs per second. It should be understood that PRIs could be configured with different periods, and transmit and receive windows could correspondingly be adapted to different PRI periods. A non-limiting example of a range of possible PRI periods is 10 ms to 250 ms. It may be noted that the link budget (power budget on the RF links) could benefit from longer PRI periods, allowing for higher transmission power, resulting in longer distance ranges between server and client stations. However, longer PRI periods could also limit opportunities for usable MMIT channels, since short duration MMITs might be excluded.

At the start of each transmit window, the transceiver may switch to transmit mode and transmit an RF pulse. At the start of each receive window, the transceiver may switch to receive mode and carry out receive operations described above for detecting an RF if one is received at the antenna. It may be noted that the duration of an actual transmitted pulse may not completely span the transmission window, but will at least occur completely within the transmission window. Likewise, the duration of actual receive operations may not completely span the transmit window, but will at least occur completely within the transmission window. These operations include ADC sampling and matched filter detection.

Each PRI may be identified by an index that increments by one for each successive PRI. The three PRIs shown in FIG. 5 have indices j, j+1, and j+2, as shown. The PRI indices may serve as identifiers of PRIs and may be used to by the client station to identify transmitted RF pulses with ones that are received by the server station. That is, PRI indices in measurement data received at the client station from the server station, as described below, may serve as confirmations of transmitted pulses that were received by the server station. PRI indices may also be used to correlate those transmitted RF pulses determined to have been received by the server station with RF pulses received from the server station, and thereby form pairs of oppositely-directed pulses that traversed from one station to the other over the same MMIT channel. The arrival times of such pairs may then be used in equation (3) to determine an instantaneous measure of the clock offset $\delta$.

As also described above, measurement data collected and formatted at the server station may be transmitted to the client station over MMIT channels. In an example embodiment, measurement data may include, for each RF pulse detected at the server station, an arrival time, a PRI index, and an SNR measurement characterizing detection strength. In consideration of the temporally-random and transient nature of MMIT channels, some degree of economy may be beneficial in determining a volume and format of the measurement data. In an example embodiment, data communications mode may use 8-FSK (frequency shift keying) modulation to transmit measurement data, thereby encoding three bits per symbol.

An example content and formatting of a measurement data message is shown in Table 1. As indicated, 19 bits are allocated to PRI index, 23 bits to pulse arrival time, six to SNR, and 16 bits to parity, for a total of 64 bits. Two additional bits are added for padding and to round up the total to 66, a number divisible by three (the number of bits per symbol). With 19 bits for PRI index, the maximum index divided by 40 PRIs per second corresponds to 13,107 seconds. For this configuration, the PRI index rolls over every 13,107 seconds, or every ~3.6 hours of continuous operation. Any ambiguity that might result from the rollover may generally be addressed during processing within the 3+ hours between each rollover. For example, the client station could append (or prepend) additional identification to measurement data received in each rollover period. Note that the arrival time may be measured with respect to the start of the transmit window of the identified PRI; this information may thus be sufficient for the client station to derive clock time of arrival.

TABLE 1

| Data Item | Range | Resolution | Bits |
|---|---|---|---|
| PRI index | 1-13,107 sec at 40 PRI per sec | one PRI | 19 |
| Pulse Arrival Time | 0-2.097 ms | 0.25 ns | 23 |
| SNR | 0-63 dB | 1 dB | 6 |
| Parity | N/A | N/A | 16 |
| Total Bits | | | 64 + 2 padding |

Figure 5B:
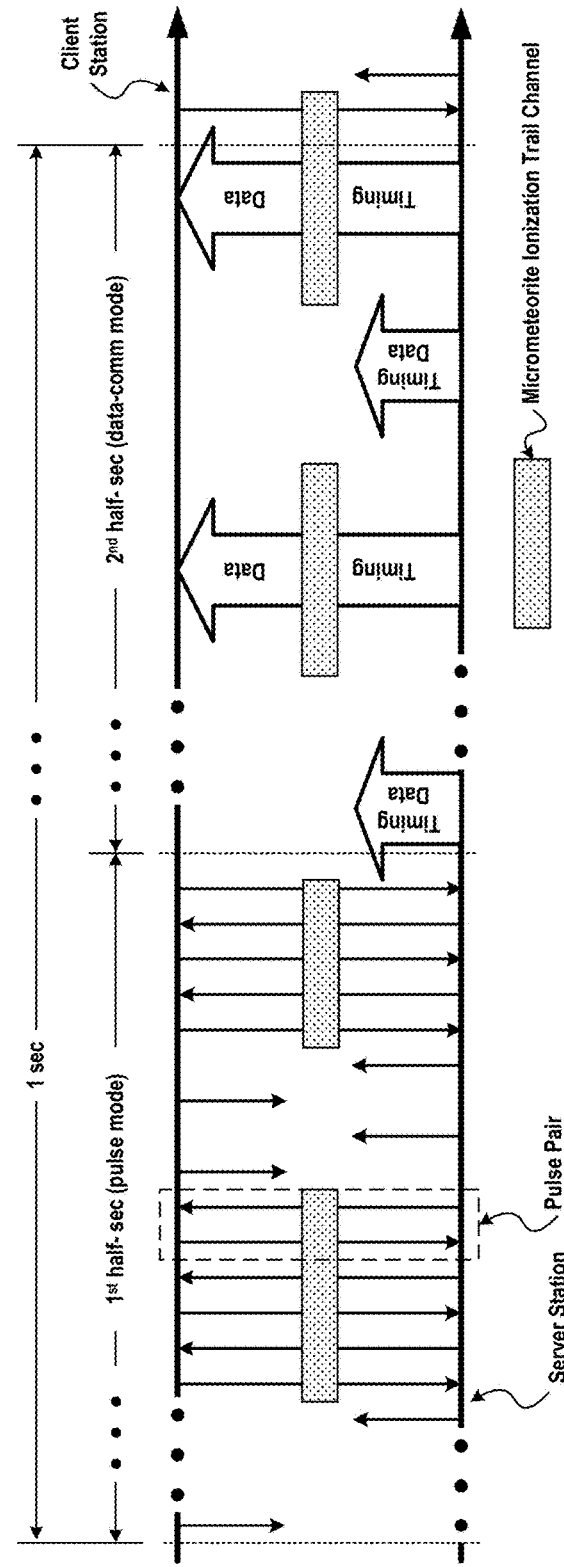
FIG. 5B is a conceptual illustration of example transmissions and receptions between server and client stations of an example clock synchronization system over micrometeorite ionization trail channels, in accordance with example embodiments.

FIG. 5B is a conceptual illustration of example transmissions and receptions between server and client stations of an example clock synchronization system over micrometeorite ionization trail channels, in accordance with example embodiments. The two stations are represented by parallel, horizontal timelines, and transmissions are shown as vertical arrows directed from each station's timeline to the other. MMIT channels are depicted as stippled horizontal bars between the two timelines occurring, intermittently in time. During times when an MMIT channel is present (e.g., available), transmissions from one station are shown as arriving at (i.e., being received by) the other stations. Conversely, during times when no MMIT channel is present, transmissions from one don't arrive at the other station. For purposes of illustration, just one second of time is shown, and its full scale is abbreviated by horizontal ellipse representing present-but-not-illustrated portions of the timelines.

As mentioned above, time multiplexing may be used to accommodate both timing signal transmissions and measurement data transmissions on a single RF frequency. In an example time multiplexing scheme, illustrated in FIG. 5B, the first half of each second may be applied to timing signal transmissions, and the second half to measurement data transmissions. In the figure, measurement data transmissions are shown as broad arrows directed from the server station to the client station, and labeled "Timing Data." As with timing signal transmissions, measurement data transmissions make it from the server station to the client station only during time intervals when MMIT channels occur (are available). Other time-multiplexing schemes could be used as well.

As also described above, the relative timing of PRIs at the server and client stations may be staggered such that the receive windows at each station align, at least approximately, with expected arrival times of transmitted RF pulses from the other station. This relative timing may facilitate each given station receiving an RF pulse from the other station over the same MMIT channel used to successfully transmit an RF pulse to the other station. Such a pair of pulses, indicated in FIG. 5B by a dashed rectangle labeled "Pulse Pair," may be identified at the client station by first correlating the PRI index in measurement data from the server station with the PRI index of a corresponding pulse transmission from the client station, and then determining if the transmit window of the corresponding pulse from the client station was followed a receive window that detected a pulse from the server station.

Due to the temporally-random nature of MMIT events and lifetimes, the occurrence of pulse pairs transmitted and received over the same MMIT channel may be expected to be similarly random. Accordingly, the durations of the transmit and receive windows may be judiciously specified to optimize the likelihood of forming pulse pairs, in view of the general unpredictability of MMIT channel availability. More particularly, existing studies of MMITs and previous experience with MMIT-based RF communications provide information about statistical distributions of MMIT events, including event frequencies, locations, and lifetimes. In addition, the inventors have carried out various system trials to help determine optimal values of transmit and receive window durations. Thus, the example values above of 10 ms for the transmit window and 15 ms for the receive window have been determined based on existing information as well as new information obtained by the inventors. It should be understood, however, that different values may be used, and could be updated from time to time-based, for example, on environmental or other time-varying factors. Non-limiting examples of such factors could include time of day, time of year, and solar activity.

The optimal values of transmit and receive window durations may also inform aspects of system design connected with the ability to achieve various transmit and receive operations within applicable timing constraints. In particular, for the example transmit and receive windows shown in FIG. 5A, the transmit/receive switch 110 of the server and client stations 100-S and 100-C needs to be able to switch between transmit and receive modes at least as fast as approximately 100 times per second. Likewise, the power amplifier 108 also needs to be able to switch this rapidly. Additionally, the potential, relative sparsity of successful station-to-station timing signal transmissions may further inform desired power requirements of the power amplifier 108 for achieving suitable SNR of detected pulses. That is, high SNR detections may help enhance the reliability and statistical confidence in analytical results. In accordance with example embodiments, then, the power amplifier 108 may be configured and/or specified for outputting 1.5 kW of power. In some example embodiments, this value may be larger, possibly as high as 10 kW of power or more. In view of the specification of optimal transmit and receive window durations, the power amplifier 108 may also need to be able to switch between modes at roughly 100 times per second while also operating in an approximate power range of 1 kW to 10 kW. To achieve these operational capabilities, the inventors have customized design, development, and implementation of the power amplifier 108.

In accordance with example embodiments, the staggering of the PRI sequences at the server and client stations may be achieved by a variety of bootstrap-like procedures at initial startup of operations. One non-limiting example of such a procedure may entail the server station initiating operations by transmitting RF pulses according to transmit windows in its sequence of PRIs. The client station may start its PRI sequence, but initially refrain from transmitting any RF pulses during its transmit windows, but instead only listen during its receive windows for RF pulses from the server station. The client station may additionally adjust the timing of its PRI sequence until it begins receiving RF pulses from the server station in at least some of its receive windows. At this point, the client station may consider that its PRIs are aligned with an appropriate staggered offset with respect to the server stations PRIs, and may thus begin transmitting its RF pulses during its transmit windows. It should be understood that this example bootstrapping procedure, or any other that may achieve the requisite relative alignment of PRI windows may be used.

Since MMIT channels are used for data communications as well as timing signals (RF pulses), it can happen that the server may accumulate more measurement data than can be accommodated over the randomly available, transient MMIT channels. In this sense, the accumulated measurement data may represent a sort of backlog of data waiting to be transmitted. In accordance with example embodiments, the server station may implement a selection algorithm to choose which measurement data to transmit to the client station. An example algorithm may balance the "age" of accumulated data (e.g., how long the data has been waiting to be transmitted) against the quality of the measurement based on SNR. In making the selection, some measurement data may ultimately be discarded instead of transmitted by the server station. Thus, it can happen that not all pulse pairs that actually occurred will ultimately be identified by the client server, since not all measurement data used to make pair identifications will necessarily be transmitted to the client station from the server station.

The effective backlog of measurement data and the selection algorithm used to address it may also result in the client station receiving measurement data at times that may be considered "historical" with respect to the RF pulse (timing signal) transmissions to which the measurement data apply. Due to the historical nature of the measurement data received by the client station, as well as the temporally-random nature of MMIT channels and the possible omission of data measurements by the selection algorithm, the time offsets derived by the client station may tend to be sparse and intermittent (e.g., irregular in time). The historical nature of the measurements may additionally introduce latency between the actual arrival times and the times at which the time-delta measurements are derived and applied to clock correction. In accordance with example embodiments, a control model/algorithm may be applied to the time-delta measurements that compensates for its sparse, irregular properties, as well as the latency, to derive time and frequency corrections that may be applied to the client clock 136-C in order to synchronize it with the server clock 136-S.

Figure 6:
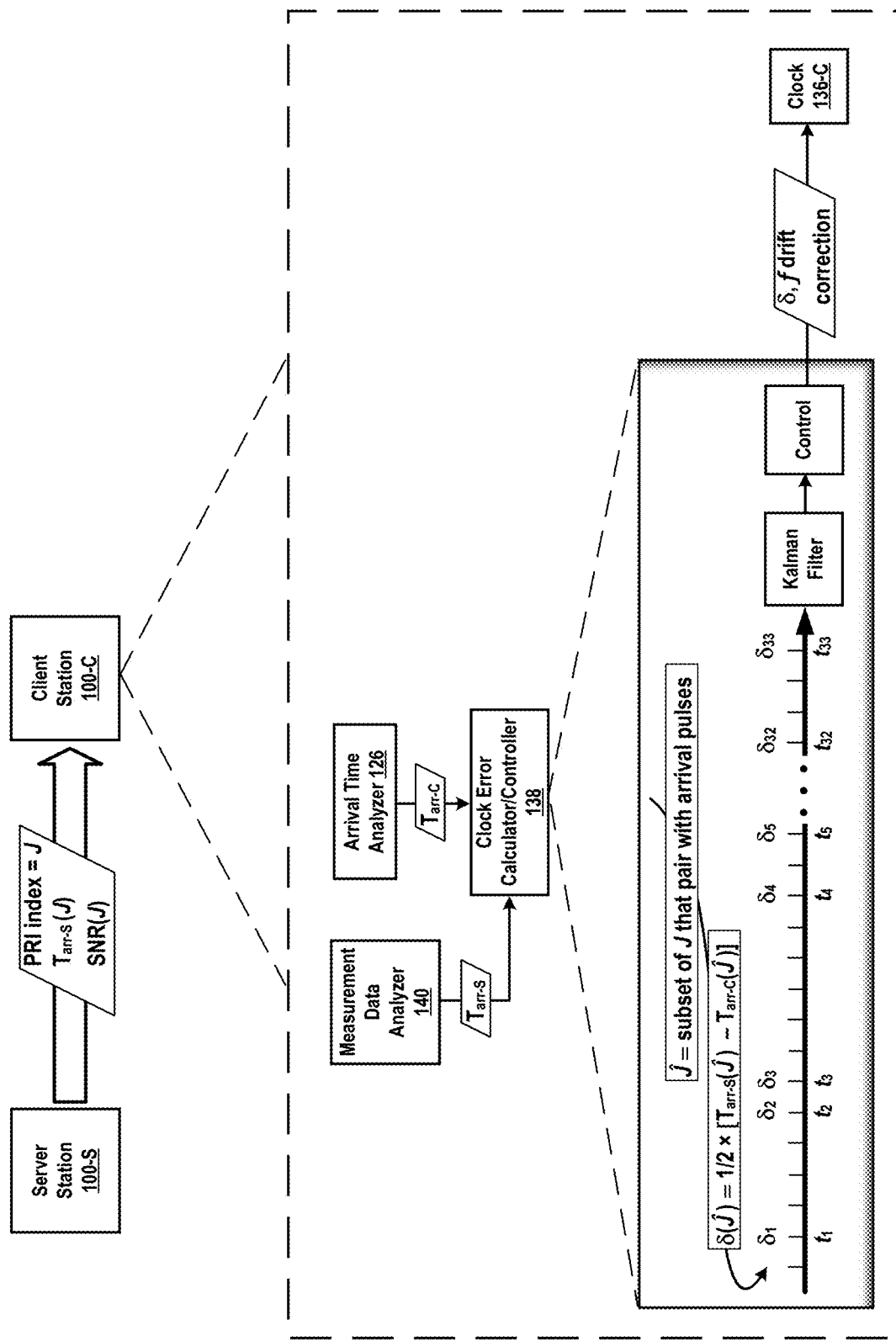
FIG. 6 illustrates example timing processing and clock corrections carried out by a client station of an example clock synchronization system, in accordance with example embodiments.

This is represented in FIG. 6, which illustrates example timing processing and clock corrections carried out by a client station of an example clock synchronization system, in accordance with example embodiments. FIG. 6 includes just a subset of the elements and components of FIG. 1 related to timing processing and clock corrections carried out by the client station 100-C. Transmission of measurement data from the server station 100-S to the client station 100-C is represented at the top of the figure by measurement data for PRI index=J, $T_{arr\text{-}S}(J)$ and SNR(J) from the server station to the client station. A dashed rectangle below the client station 100-C represents particular operations, and the components of the client station that carry them out.

In an example embodiment, the measurement data analyzer 140 may extract arrival times at the server station of RF pulses and input them to the clock error calculator/controller 138, as indicated. The arrival time analyzer 126 may derive arrival times at the client station of pulses received from the server station and input them to the clock error calculator/controller 138, as also indicated. Although not explicitly shown, PRI indices and SNR measurements may also be input to the clock error calculator/controller 138. The clock error calculator/controller 138 may then carry out one or another form the correlations and identifications, such those described by way of example above, and form pairs of arrival time values corresponding to two oppositely-directed RF pulses that were transmitted between stations over the same MMIT channel. This is represented in FIG. 6 by the indices $\hat{J}$, which represent the subset of J for which pairs have been identified. The arrival time pairs may then be used compute a clock offset for each index $\hat{J}$ according to equation (3). This is represented in FIG. 6 by the expression $\iota(\hat{J})=\frac{1}{2}[T(\hat{J})_{arr\text{-}S}-T(\hat{J})_{arr\text{-}C}]$.

As described above, the time offsets for those PRIs which yield them may be thought of as a stream of intermittent time-delta measurements (i.e., time offsets). A representative stream is indicated in FIG. 6 as $\delta_1, \delta_2, \delta_3, \ldots, \delta_{33}$ along a timeline at corresponding times $t_1, t_2, t_3, \ldots t_{33}$. As also described, the distribution of the time offsets across the timeline is sparse and irregular. In accordance with example embodiments, the sparseness and temporal irregularity of the time-delta measurements may be compensated by a Kalman filter, or more generally, a sequential state estimator. The filter may compute a time offset and frequency drift error which may then be input to a control algorithm/model resulting in a frequency correction that may then be applied to the client clock 136-C to synchronize it with the server clock 136-S. The process represented graphically in FIG. 6 may be carried out on a continuous, or nearly continuous, basis to maintain synchronization of the client clock with the server clock. In this way, factors of imperfect oscillator stability that might otherwise cause the client clock to drift from the server clock may be continuously be compensated and corrected. In some example embodiments, the clock 136-C may include, or be part of, a device that integrates software capabilities that could carry out the operations attributed above to the clock error calculator/controller 138.

In practice, while the server station may be largely identical to the client station, as the reference clock, it may include additional components or elements that enable it to maintain synchronization with one or another form of time standard, such as GPS. In accordance with example embodiments, the server station may serve as a reference clock for multiple client stations, each operating as described by way of example above for the client system 100-C.

Figure 7:
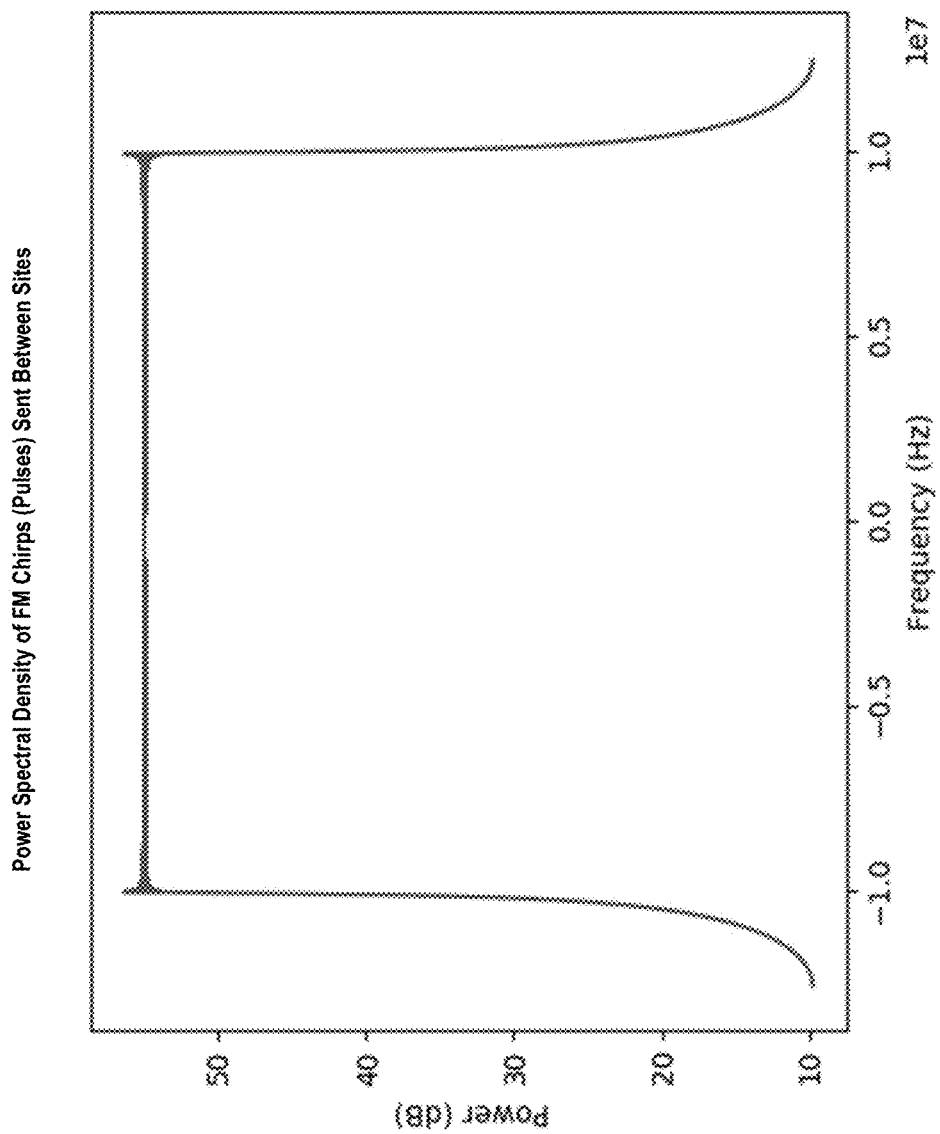
FIG. 7 illustrates an example RF pulse in frequency space, in accordance with example embodiments.

FIG. 7 illustrates an example RF pulse in frequency space. As shown, the pulse may have a width of 20 MHz with a largely flat power spectral density (power distribution), level at approximately 60 dB. It should be understood that different power spectral densities could be used for RF pulses, and that different power spectral densities having different spectral shapes (and power distributions) could be applied with a 20 MHz width or a different width. A non-limiting example is a phase-modulated maximal-length code sequence. Other waveforms could suppress certain frequencies to avoid interference with other radio bands, for example.

Figure 8:
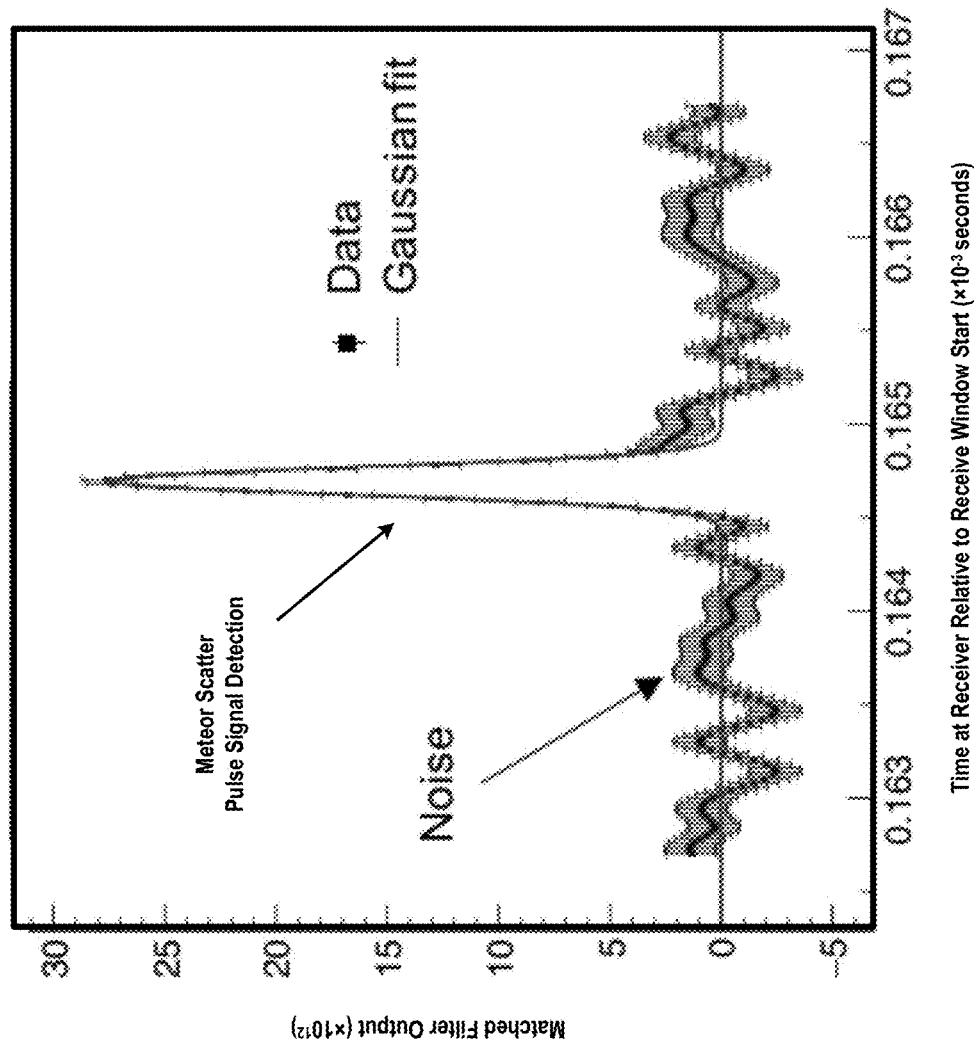
FIG. 8 illustrates an example RF pulse detection and arrival time measurement, in accordance with example embodiments.

FIG. 8 illustrates an example of pulse detection in the time domain. Individual data samples are shown as black square with error bars, and a solid line represents a Gaussian fit of the match filter to the sampled data. The parameters of the fit yield peak power and arrival time.

III. Example Methods

Figure 9:
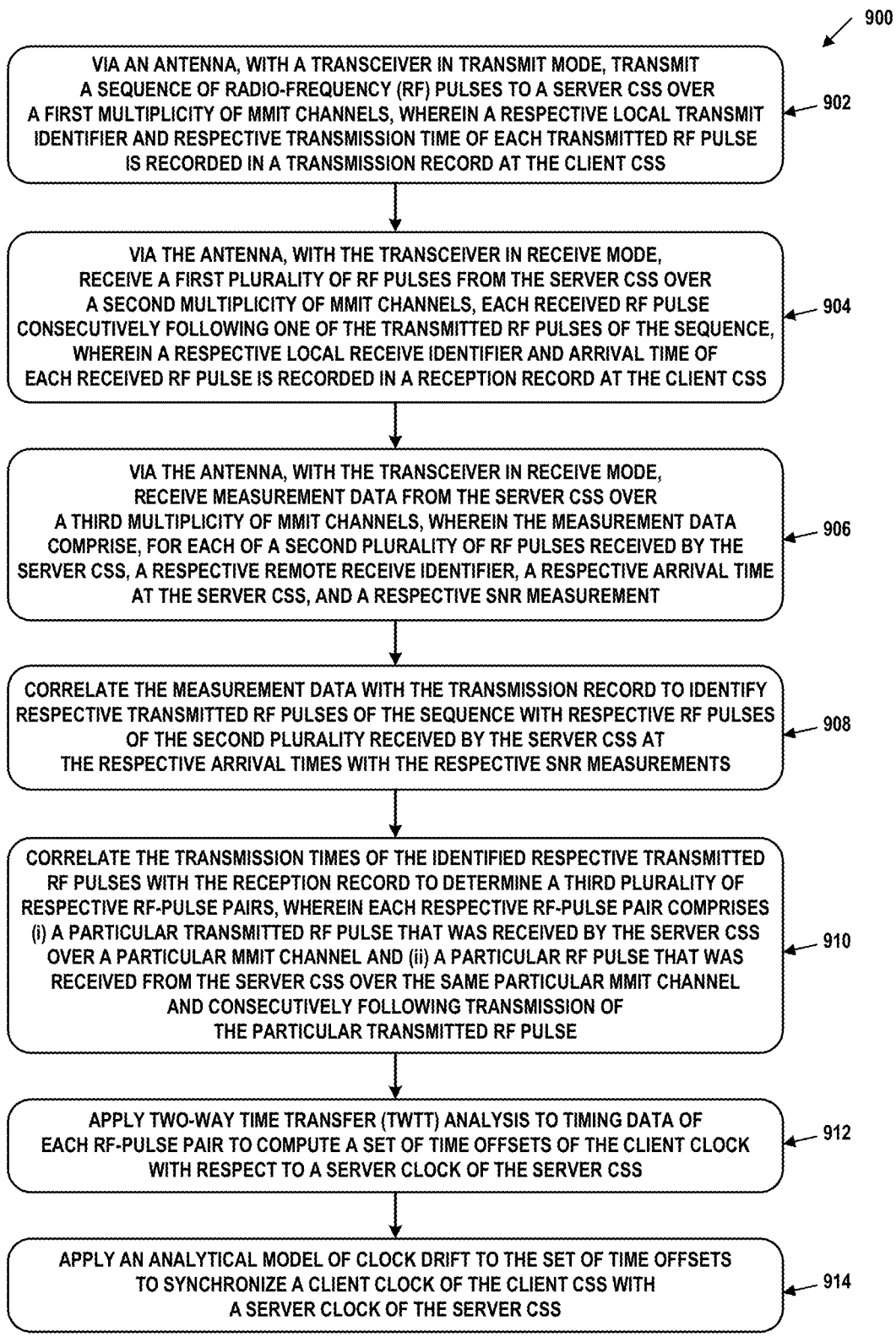
FIG. 9 is a flow chart of an example method, in accordance with example embodiments.

FIG. 9 is a flows chart illustrating a respective example embodiments of a method 900. The method illustrated in FIG. 9 may be carried out by a client clock synchronization system (CSS) that includes an antenna, a transceiver coupled with the antenna and configured for switching between transmit and receive modes, and a computing system coupled with the transceiver and with a client clock. The computing system may be configured to carry out, and/or to cause, various operations of the example method 900. Non-limiting examples of the computing system computing system may include computing device 200 or server cluster 304, for example. However, the method can be carried out by other types of devices or device subsystems. For example, the process could be carried out by a portable computer, such as a laptop or a tablet device. The client CSS may be configured for communications with a server CSS over micrometeorite ionization trail (MMIT) channels. As is known, MMIT channels are distributed randomly in both time and location within the Earth's ionosphere, and have lifetimes distributed randomly in duration.

The embodiments of FIG. 9 may be simplified by the removal of any one or more of the features shown therein. Further, these embodiments may be combined with features, aspects, and/or implementations of any of the previous figures or otherwise described herein.

The example 900 may also be embodied as instructions executable by one or more processors of the one or more server devices of the system or virtual machine or container. For example, the instructions may take the form of software and/or hardware and/or firmware instructions. In an example embodiment, the instructions may be stored on a non-transitory computer readable medium. When executed by one or more processors of the one or more servers, the instructions may cause the one or more servers to carry out various operations of the example method.

In example embodiments, the computing system of the client CSS may be configured to carry out, and/or to cause execution of, various operations of the example method 900.

Block 902 of example method 900 may involve, via the antenna, with the transceiver in transmit mode, transmitting a sequence of radio-frequency (RF) pulses to the server CSS over a first multiplicity of MMIT channels. Transmission information indicating a respective local transmit identifier and respective transmission time of each transmitted RF pulse may be maintained at the client CSS. For example, the transmission information could be stored or recorded in a structured record or table.

Block 904 of example method 900 may involve via the antenna, with the transceiver in receive mode, receiving a first plurality of RF pulses from the server CSS over a second multiplicity of MMIT channels, each received RF pulse consecutively following one of the transmitted RF pulses of the sequence. Reception information indicating a respective local receive identifier and arrival time of each received RF pulse may be maintained at the client CSS. For example, the reception information could be stored or recorded in a structured record or table.

Block 906 of example method 900 may via the antenna, with the transceiver in receive mode, receiving measurement data from the server CSS over a third multiplicity of MMIT channels. The measurement data may be associated with a second plurality of RF pulses received by the server CSS, and may include, for each of the second plurality, a respective remote receive identifier, a respective arrival time at the server CSS, and a respective signal-to-noise (SNR) measurement.

Block 908 of example method 900 may involve correlating the measurement data with the transmission information to identify respective transmitted RF pulses of the sequence with respective RF pulses of the second plurality received by the server CSS at the respective arrival times with the respective SNR measurements. This operation may thus identify which of the transmitted RF pulses of sequence were received by the server CSS.

Block 910 of example method 900 may involve correlating the transmission times of the identified respective transmitted RF pulses with the reception information to determine a third plurality of respective RF-pulse pairs. Each respective RF-pulse pair may include (i) a particular transmitted RF pulse that was received by the server CSS over a particular MMIT channel and (ii) a particular RF pulse that was received from the server CSS over the same particular MMIT channel and consecutively following transmission of the particular transmitted RF pulse. This operation may thus correspond to the pulse pairs described above.

Block 912 of example method 900 may involve applying two-way time transfer (TWTT) analysis to timing data of each RF-pulse pair to compute a set of time offsets of the client clock with respect to a server clock of the server CSS.

Finally, block 914 of example method 900 may involve, applying an analytical model of clock drift to the set of time offsets to synchronize the client clock with the server clock.

In accordance with example embodiments, client CSS m a switched amplifier component coupled with the transceiver, and configured for switching the transceiver between transmit and receive modes at a switching rate within a range of [5 Hz, 150 Hz], while operating within a power range of [0.5 kW, 10 kW]. With this arrangement, transmitting with the transceiver may entail the switched amplifier component switching the transceiver to transmit mode, and receiving with the transceiver may entail the switched amplifier component switching the transceiver to receive mode.

In accordance with example embodiments, the antenna may be a directional antenna. With this arrangement, transmitting the sequence of RF pulses to the server CSS over the first multiplicity of MMIT channels may involve transmitting the sequence of RF pulses at a target azimuthal angle substantially directed to the server CSS, and at a target elevation angle directed toward the Earth's ionosphere and substantially coincident with an incident angle that reflects toward the server CSS. Likewise receiving the first plurality of RF pulses from the server CSS over the second multiplicity of MMIT channels may involve receiving the first plurality of RF pulses from the target azimuthal angle, and directed from the Earth's ionosphere substantially along the target elevation angle. Here, the terms "substantially directed" and "substantially coincident" signify a general property of directional RF antennas and the radiation pattern they produce. Namely, the radiation pattern may generally have angular distribution in elevation and azimuth such that for the power may not be entirely confined to the direction of transmission. By reciprocity, the radiation pattern also describes the angular distribution of sensitivity to power reception. Thus, transmitting in, or receiving from, a given direction may not necessarily require an exact or perfect alignment with the given direction. Hence the term "substantially."

In accordance with example embodiments, the sequence of RF pulses may be transmitted in a periodic sequence of pulse repetition intervals (PRIs), with one transmitted RF pulse per PRI. Each PRI may include a transmit window followed by a receive window. In this configuration, each RF pulse of the sequence may be transmitted during one of the transmit windows, and each RF pulse of the first plurality may be received during one of the receive windows. Further, the respective local transmit identifier of a given transmitted RF pulse of the sequence may be a sequence number of the PRI in which the given transmitted RF pulse was transmitted, and the respective remote receive identifier of a given RF pulse of the second plurality may be a sequence number tracked by the server CSS of the PRI in which the given RF pulse of the second plurality was received by the server CSS. With this arrangement, correlating the measurement data with the transmission information may involve matching the respective local transmit identifiers with the respective remote receive identifiers.

In accordance with example embodiments, the PRI may be 25 milliseconds. Other values of PRI period could also be used. A non-limiting example of a range of possible PRI periods is 10 ms to 250 ms.

In accordance with example embodiments, receiving the first plurality of RF pulses may involve applying a matched filter to data samples from a received signal sampled at a fixed sampling rate during each respective receive window that consecutively follows each transmitted RF pulse. This may be followed by applying a threshold to the matched filter output of each respective receive window to determine which receive windows yield a detected pulse. In addition, the operations may further include determining an arrival time of each received RF pulse by fitting an arrival-time curve to each detected pulse.

In accordance with example embodiments, the sampling rate may be 25 MHz. Other sampling rates could be used. A non-limiting example of a range of sampling rates is 10 Mhz to 100 MHz.

In accordance with example embodiments, fitting the arrival-time curve to each detected pulse may involve applying an interpolation to the data samples of each detected pulse to compute an effective time resolution higher than that of the sampling rate.

In accordance with example embodiments, the set of time offset be or include sparse, intermittent time offset measurements with associated uncertainties derived from SNR measurements of both the first plurality of RF pulses measured by the client CSS and the second plurality of RF pulses measured by the server CSS. Further, the analytical model of clock drift may include a control algorithm with a state representation of time offset and frequency offset, and a sequential state estimator, such as a Kalman filter, configured to compensate for the sparse, intermittent time offset measurements. The analytical model may additionally compensate for latency between actual arrival times and when they are reported and used to derive the corresponding time offsets. With this arrangement, applying the model of clock drift to the set of time offsets to synchronize the client clock with the server clock may involve updating a covariance matrix of the analytical model for each respective time offset of the set, and then computing an updated state based on the respective offset; and applying control to adjust the client clock according to the updated state.

In accordance with example embodiments, applying the analytical model of clock drift to the set of time offsets to synchronize the client clock with the server clock may involve synchronizing the client clock to within 4 nanoseconds agreement with the server clock.

In accordance with example embodiments, transmission of RF pulses and reception of RF pulses may be carried out using a common, first RF frequency, reception of the measurement data may be carried out using time multiplexing with a second RF frequency that is the same as the first RF frequency, or frequency multiplexing with a second RF frequency that is different than the first RF frequency.

IV. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

In addition to the illustrations presented in FIGS. 1-8, further illustrative examples and depictions are presented in figures shown in Appendix A and Appendix B that accompany this disclosure.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A client clock synchronization system (CSS) configured for communications with a server CSS over micrometeorite ionization trail (MMIT) channels, the client CSS comprising:
    an antenna;
    a transceiver coupled with the antenna and configured for switching between transmit and receive modes; and
    a computing system coupled with the transceiver and with a client clock, and configured for carrying out operations including:
        via the antenna, with the transceiver in transmit mode, transmitting a sequence of radio-frequency (RF) pulses to the server CSS over a first multiplicity of MMIT channels, wherein transmission information indicating a respective local transmit identifier and respective transmission time of each transmitted RF pulse is maintained at the client CSS;
        via the antenna, with the transceiver in receive mode, receiving a first plurality of RF pulses from the server CSS over a second multiplicity of MMIT channels, each received RF pulse consecutively following one of the transmitted RF pulses of the sequence, wherein reception information indicating a respective local receive identifier and arrival time of each received RF pulse is maintained at the client CSS;
        via the antenna, with the transceiver in receive mode, receiving measurement data from the server CSS over a third multiplicity of MMIT channels, wherein the measurement data comprise, for each of a second plurality of RF pulses received by the server CSS, a respective remote receive identifier, a respective arrival time at the server CSS, and a respective signal-to-noise (SNR) measurement;
        correlating the measurement data with the transmission information to identify respective transmitted RF pulses of the sequence with respective RF pulses of the second plurality received by the server CSS at the respective arrival times with the respective SNR measurements;
        correlating the transmission times of the identified respective transmitted RF pulses with the reception information to determine a third plurality of respective RF-pulse pairs, wherein each respective RF-pulse pair comprises (i) a particular transmitted RF pulse that was received by the server CSS over a particular MMIT channel and (ii) a particular RF pulse that was received from the server CSS over the same particular MMIT channel and consecutively following transmission of the particular transmitted RF pulse;
        applying two-way time transfer (TWTT) analysis to timing data of each RF-pulse pair to compute a set of time offsets of the client clock with respect to a server clock of the server CSS; and
        applying an analytical model of clock drift to the set of time offsets to synchronize the client clock with the server clock.

2. The client CSS of claim 1, further comprising a switched amplifier component coupled with the transceiver, and configured for switching the transceiver between transmit and receive modes at a switching rate within a range of [5 Hz, 150 Hz], while operating within a power range of [0.5 kW, 2.5 kW],
    wherein transmitting with the transceiver comprises the switched amplifier component switching the transceiver to transmit mode,
    wherein receiving with the transceiver comprises the switched amplifier component switching the transceiver to receive mode.

3. The client CSS of claim 1, wherein the antenna comprises a directional antenna,
    wherein transmitting the sequence of RF pulses to the server CSS over the first multiplicity of MMIT channels comprises transmitting the sequence of RF pulses at a target azimuthal angle substantially directed to the server CSS, and at a target elevation angle directed toward the Earth's ionosphere and substantially coincident with an incident angle that reflects toward the server CSS, and,
    and wherein receiving the first plurality of RF pulses from the server CSS over the second multiplicity of MMIT channels comprises receiving the first plurality of RF pulses from the target azimuthal angle, and directed from the Earth's ionosphere substantially along the target elevation angle.

4. The client CSS of claim 1, wherein the sequence of RF pulses is transmitted in a periodic sequence of pulse repetition intervals (PRIs), one transmitted RF pulse per PRI,
    wherein each PRI comprises a transmit window followed by a receive window,
    wherein each RF pulse of the sequence is transmitted during one of the transmit windows, wherein each RF pulse of the first plurality is received during one of the receive windows, wherein the respective local transmit identifier of a given transmitted RF pulse of the sequence is a sequence number of the PRI in which the given transmitted RF pulse was transmitted, wherein the respective remote receive identifier of a given RF pulse of the second plurality is a sequence number tracked by the server CSS of the PRI in which the given RF pulse of the second plurality was received by the server CSS, and wherein correlating the measurement data with the transmission information comprises matching the respective local transmit identifiers with the respective remote receive identifiers.

5. The client CSS of claim 4, wherein the PRI is 25 milliseconds.

6. The client CSS of claim 1, wherein receiving the first plurality of RF pulses comprises:

during each respective receive window that consecutively follows each transmitted RF pulse, applying a matched filter to data samples from a received signal sampled at a fixed sampling rate; and applying a threshold to the matched filter output of each respective receive window to determine which receive windows yield a detected pulse, and wherein the operations further include determining an arrival time of each received RF pulse by fitting an arrival-time curve to each detected pulse.

7. The client CSS of claim 6, wherein the sampling rate is 25 MHz.

8. The client CSS of claim 6, wherein fitting the arrival-time curve to each detected pulse comprises applying an interpolation to the data samples of each detected pulse to compute an effective time resolution higher than that of the sampling rate.

9. The client CSS of claim 1, wherein the set of time offsets comprises sparse, intermittent time offset measurements with associated uncertainties derived from SNR measurements of both the first plurality of RF pulses measured by the client CSS and the second plurality of RF pulses measured by the server CSS, wherein the analytical model of clock drift comprises a control algorithm with a state representation of time offset and frequency offset, and a sequential state estimator configured to compensate for the sparse, intermittent time offset measurements, and wherein applying the model of clock drift to the set of time offsets to synchronize the client clock with the server clock comprises:

updating a covariance matrix of the analytical model for each respective time offset of the set;

computing an updated state based on the respective offset; and applying control to adjust the client clock according to the updated state.

10. The client CSS of claim 1, wherein applying the analytical model of clock drift to the set of time offsets to synchronize the client clock with the server clock comprises synchronizing the client clock to within 4 nanoseconds agreement with the server clock.

11. The client CSS of claim 1, wherein transmission of RF pulses and reception of RF pulses are carried out using a common, first RF frequency, and wherein reception of the measurement data is carried out using one of: time multiplexing with a second RF frequency that is the same as the first RF frequency, or frequency multiplexing with a second RF frequency that is different than the first RF frequency.

12. A server clock synchronization system (CSS) configured for communications with a client CSS over micrometeorite ionization trail (MMIT) channels, wherein the MMIT channels are distributed randomly in both time and location within the Earth's ionosphere, and have lifetimes distributed randomly in duration, the server CSS comprising:

an antenna;

a transceiver coupled with the antenna and configured for switching between transmit and receive modes; and a computing system coupled with the transceiver and with a server clock, and configured for carrying out operations including:

via the antenna, with the transceiver in transmit mode, transmitting a sequence of radio-frequency (RF) pulses to the client CSS over a first multiplicity of MMIT channels;

via the antenna, with the transceiver in receive mode, receiving a first plurality of RF pulses from the client CSS over a second multiplicity of MMIT channels, each consecutively following one of the transmitted RF pulses of the sequence;

via the antenna, with the transceiver in transmit mode, transmitting measurement data to the client CSS over a third multiplicity of MMIT channels, wherein the measurement data comprise, for each of a sub-plurality of the first plurality of RF pulses received by the server CSS, a respective local receive identifier, the respective arrival time at the server CSS, and a respective signal-to-noise (SNR) measurement.

13. The server CSS of claim 12, wherein the first and second multiplicities of MMIT channels are at least partially overlapping, and wherein the third multiplicity of MMIT channels is at least partially overlapping with at least one of the first or second multiplicities of MMIT channels.

14. The server CSS of claim 12, wherein the operations further include selecting each given RF pulse of the sub-plurality from among the first plurality of RF pulses based at least on: the respective SNR of the given RF pulse, or an elapsed time measured from the respective arrival time of the given RF pulse.

15. The server CSS of claim 12, further comprising a switched amplifier component coupled with the transceiver, and configured for switching the transceiver between transmit and receive modes at a switching rate within a range of [5 Hz, 150 Hz], while operating within a power range of [0.5 kW, 2.5 kW], wherein transmitting with the transceiver comprises the switched amplifier component switching the transceiver to transmit mode, wherein receiving with the transceiver comprises the switched amplifier component switching the transceiver to receive mode.

16. The server CSS of claim 12, wherein the antenna comprises a directional antenna, wherein transmitting the sequence of RF pulses to the client CSS over the first multiplicity of MMIT channels comprises transmitting the sequence of RF pulses at a target azimuthal angle substantially directed to the client CSS, and at a target elevation angle directed toward the Earth's ionosphere and substantially coincident with an incident angle that reflects toward the client CSS, and, and wherein receiving the first plurality of RF pulses from the client CSS over the second multiplicity of MMIT channels comprises receiving the first plurality of RF pulses from the target azimuthal angle, and directed from the Earth's ionosphere substantially along the target elevation angle.

17. The server CSS of claim 12, wherein the sequence of RF pulses is transmitted in a periodic sequence of pulse repetition intervals (PRIs), one transmitted RF pulse per PRI, wherein each PRI comprises a transmit window followed by a receive window, wherein each RF pulse of the sequence is transmitted during one of the transmit windows, wherein each RF pulse of the first plurality is received during one of the receive windows, and wherein the respective local receive identifier of a given RF pulse of the first plurality is a sequence number of the PRI in which the given RF pulse of the first plurality was received.

18. The server CSS of claim 17, wherein the PRI is 25 milliseconds.

19. The server CSS of claim 12, wherein receiving the first plurality of RF pulses comprises:

during each respective receive window that consecutively follows each transmitted RF pulse, applying a matched filter to data samples from a received signal sampled at a fixed sampling rate; and applying a threshold to the matched filter output of each respective receive window to determine which receive windows yield a detected pulse, and wherein the operations further include determining an arrival time of each received RF pulse by fitting an arrival-time curve to each detected pulse.

20. A method of clock synchronization carried out by a client synchronization system (CSS) configured for communications with a server CSS over micrometeorite ionization trail (MMIT) channels, wherein MMIT channels are distributed randomly in both time and location within the Earth's ionosphere, and have lifetimes distributed randomly in duration, the method comprising:

via an antenna, with a transceiver in transmit mode, transmitting a sequence of radio-frequency (RF) pulses to the server CSS over a first multiplicity of MMIT channels, wherein transmission information indicating a respective local transmit identifier and respective transmission time of each transmitted RF pulse is maintained at the client CSS;

via the antenna, with the transceiver in receive mode, receiving a first plurality of RF pulses from the server CSS over a second multiplicity of MMIT channels, each received RF pulse consecutively following one of the transmitted RF pulses of the sequence, wherein reception information indicating a respective local receive identifier and arrival time of each received RF pulse is maintained at the client CSS;

via the antenna, with the transceiver in receive mode, receiving measurement data from the server CSS over a third multiplicity of MMIT channels, wherein the measurement data comprise, for each of a second plurality of RF pulses received by the server CSS, a respective remote receive identifier, a respective arrival time at the server CSS, and a respective signal-to-noise (SNR) measurement;

correlating the measurement data with the transmission information to identify respective transmitted RF pulses of the sequence with respective RF pulses of the second plurality received by the server CSS at the respective arrival times with the respective SNR measurements;

correlating the transmission times of the identified respective transmitted RF pulses with the reception information to determine a third plurality of respective RF-pulse pairs, wherein each respective RF-pulse pair comprises (i) a particular transmitted RF pulse that was received by the server CSS over a particular MMIT channel and (ii) a particular RF pulse that was received from the server CSS over the same particular MMIT channel and consecutively following transmission of the particular transmitted RF pulse;

applying two-way time transfer (TWTT) analysis to timing data of each RF-pulse pair to compute a set of time offsets of the client clock with respect to a server clock of the server CSS; and applying an analytical model of clock drift to the set of time offsets to synchronize a client clock of the client CSS with a server clock of the server CSS.

* * * * *